Dec. 28, 1965   J. E. GAFFNEY, JR   3,226,683
SEQUENTIAL DECISION MAKING DEVICE
Filed Oct. 19, 1960   12 Sheets-Sheet 1
FIG.1
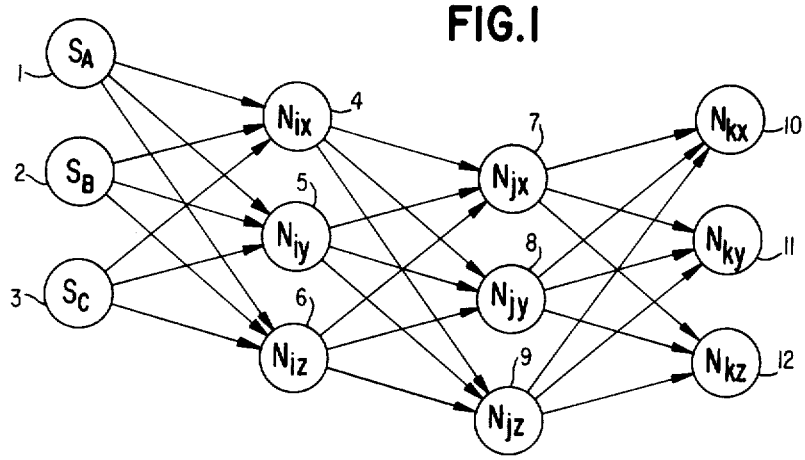
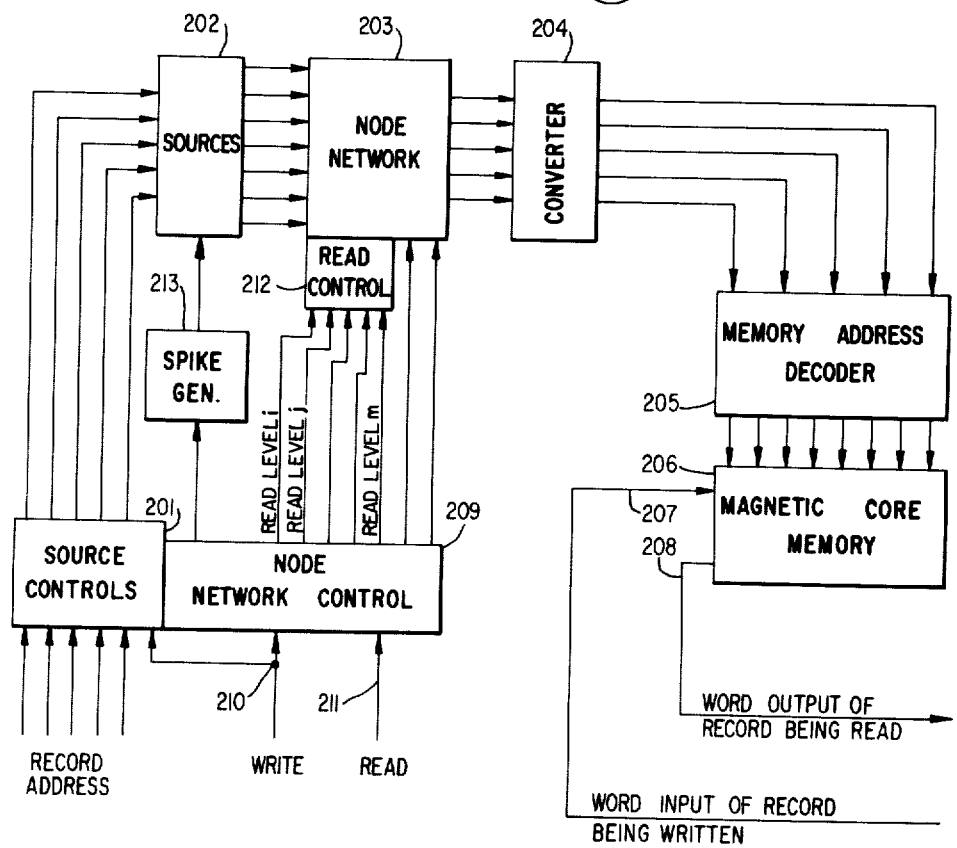
FIG.2
INVENTOR.
JOHN E. GAFFNEY, Jr.
BY
ATTORNEY.

Dec. 28, 1965   J. E. GAFFNEY, JR   3,226,683
SEQUENTIAL DECISION MAKING DEVICE
Filed Oct. 19, 1960   12 Sheets-Sheet 4

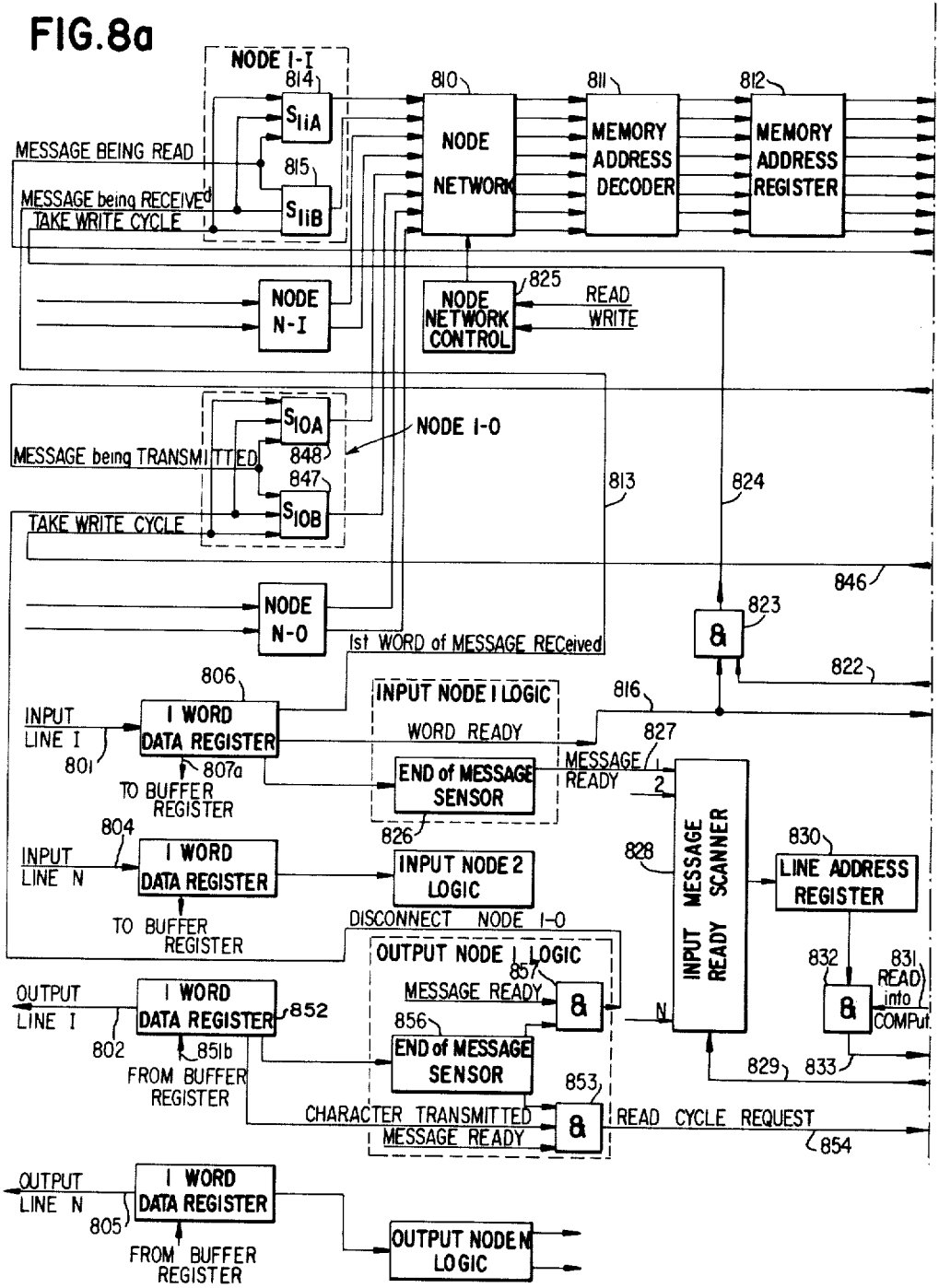

Dec. 28, 1965

J. E. GAFFNEY, JR 3,226,683

SEQUENTIAL DECISION MAKING DEVICE

Filed Oct. 19, 1960

Dec. 28, 1965   J. E. GAFFNEY, JR   3,226,683
SEQUENTIAL DECISION MAKING DEVICE
Filed Oct. 19, 1960   12 Sheets-Sheet 7

United States Patent Office 3,226,683
Patented Dec. 28, 1965

3,226,683
SEQUENTIAL DECISION MAKING DEVICE

John E. Gaffney, Jr., Briarcliff Manor, N.Y., assignor to International Business Machines Corporation, New York, N.Y., a corporation of New York
Filed Oct. 19, 1960, Ser. No. 63,631
15 Claims. (Cl. 340—172.5)

This invention relates to logic circuits and more particularly to a sequential decision making logic circuit.

In many computer applications it is necessary to produce a plurality of control voltages for controlling the operation of the computer. These control signals must be produced in a certain sequence and the sequence must be reproducible.

As an example, a magnetic core memory addressing circuit must produce a plurality of control voltages for gating the various words of a particular record into particular storage locations in the memory. The sequence of these control voltages must be reproduced when it is desired to read the record out of the memory so that all words of the record are read out in the correct sequence. Further, the addressing circuit must tabulate available storage locations in the computer memory so that a record which is to be written into the memory is gated to an available storage location. The problem of tabulating available storage locations in a computer memory and assigning addresses in such a manner that a prescribed distribution of data in the memory unit is assured has long been recognized as an important one.

In a particular system it may be desirable that data of a given category be stored in a prescribed segment of the memory and in another system it may be desirable that all data be distributed uniformly throughout the memory since all data is of a given category. In such a case, all of the data should not be concentrated in clusters about particular addresses. Normally, the operation of a memory unit is so programmed that a tabulation of available storage locations is maintained and there is a prescribed set of rules which is applied in choosing a particular storage location from the list of available ones. In such an arrangement, storage space is wasted in maintaining the tabulation of available storage locations. It would be desirable for the memory unit to accept a piece of data and file it without having the particular storage designation assigned by either the programmer or by a compiler routine. Such a memory unit would be structured so that it could be given some choice in finding a storage location. In such a unit addresses or storage locations would be assigned to a sequence of inputs by means of a sequence of choices where one choice is assigned to each word of the input.

Another application in which control signals must be produced in a certain sequence is the operation of a buffer storage unit which operates between several data transmission lines and a digital computer which both receives data from these lines and transmits data out of the computer on the lines. Many prior art digital computers have operated on the fixed word length principle so that a buffer storage unit having a definite number of storage locations is provided between each transmission line and the digital computer. However, many digital computers now operate on a variable word length technique so that it is not desirable to provide a buffer storage unit of a definite number of storage locations between each transmission line and the digital computer. If this were done, a great number of storage locations would be wasted since each buffer unit would have to have as many storage locations as the maximum number of words possible in each record. Under these circumstances, it is desirable to provide a single buffer unit between all of the data transmission lines and the digital computer and to assign storage space in the buffer in a manner such that the buffer can service all of the lines.

Another computer application in which a number of specific sequences of control voltages are required is in programming the tasks which are to be performed by a digital computer. Many digital computers now have a large number of units connected in the system. For example, a digital computer may have several input-output units, several memory units and several arithmetic and logical units. Many times it is not necessary to utilize all of these units in carrying out a particular program. Under such circumstances it may be possible to simultaneously perform several programs if a control device can be provided to sequence the tasks which are to be performed by the computer. Such a control device must be capable of determining which units are available for performing a given task and must be capable of establishing preferences in performing particular tasks between the various programs.

Accordingly, it is an object of the present invention to provide a sequential decision-making device for controlling the operation of a digital computer.

It is another object of the present invention to provide a node network in which connections can be made between various nodes so that the nodes sequentially control the operation of a digital computer.

It is another object of the present invention to provide a memory addressing circuit which gates input words to available memory storage locations without maintaining a tabulation of available storage locations.

It is another object of the present invention to provide an improved memory address circuit in which extra storage space need not be used for the tabulation of available storage locations.

It is a further object of the present invention to provide a control system for a buffer storage unit so that a single buffer storage unit can be used between a plurality of data transmission lines and a digital computer.

It is a further object of the present invention to provide an improved buffer storage unit for variable word length computer systems.

It is a further object of the present invention to provide a sequential task-ordering device for use with a digital computer having a number of operating units capable of performing certain tasks.

It is a still further object of the present invention to provide a sequential task-ordering device which controls the operation of a digital computer so that several programs can be carried on simultaneously in the computer.

These and further objects and advantages of the present invention will become more apparent from the following description and appended claims taken in conjunction with the drawings in which:

FIGURE 1 is the diagrammatic showing of a node network used for addressing a memory;

FIGURE 2 is a block diagram of a memory addressing system;

FIGURE 8a is a portion of a block diagram of a buffer storage system;

Figure 3:
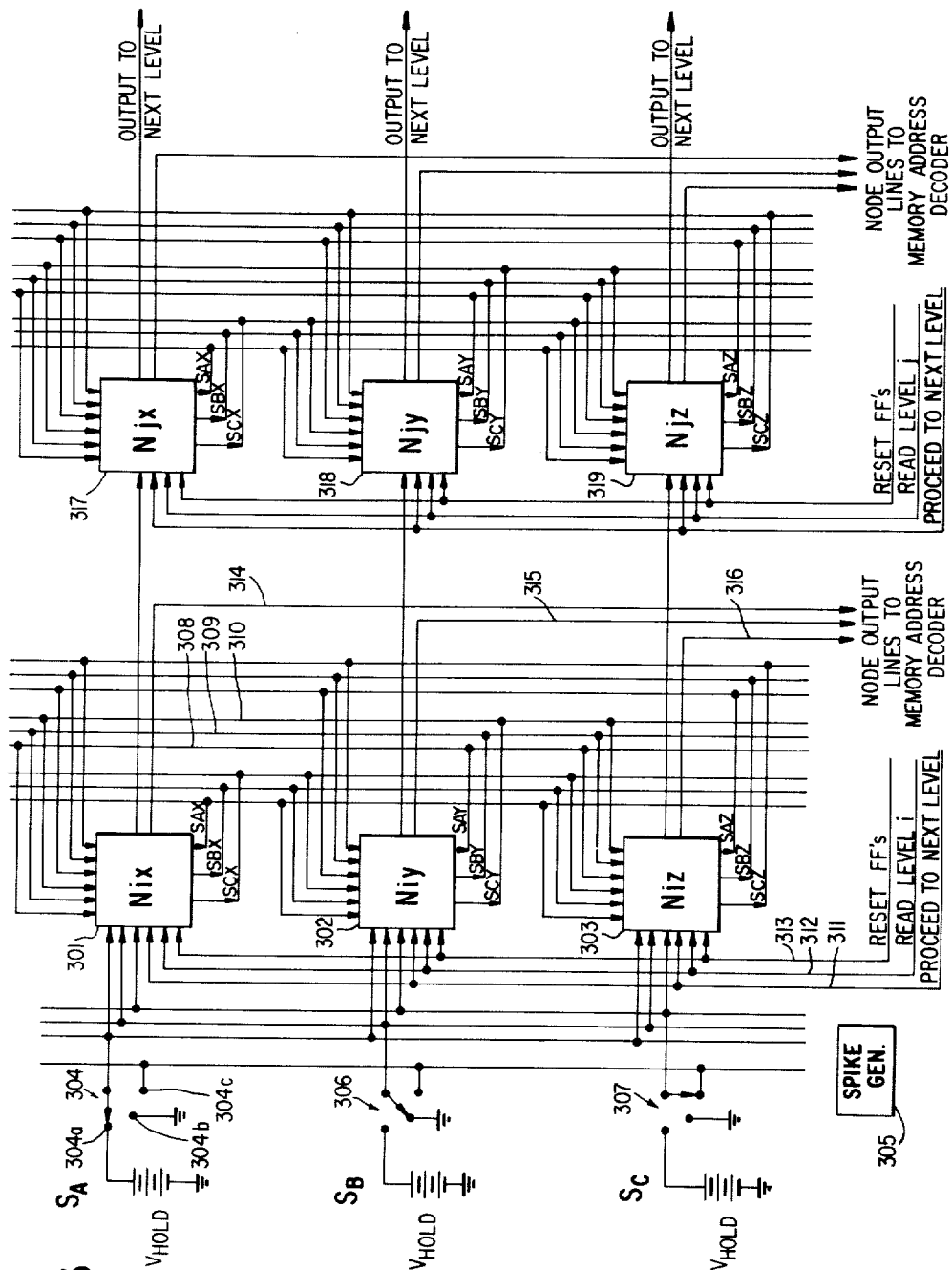
FIGURE 3 is a block diagram of two levels of the node network.

In accordance with one embodiment of the invention a self-addressing memory is provided which completely relieves the programmer of the sometimes arduous task of maintaining tables of available and unavailable memory locations. With this device, provided sufficient space remains in the memory to accommodate a given record, this record can be written into the memory without specification of the particular locations into which it is to be written. The only address associated with this record is an identification number or other "name" by which it can be referred to subsequently.

By means of this device, certain areas of memory can be given greater preference for selection as storage space than other areas for a given record or class of records. This feature could be used to facilitate a "clustering" of selected addresses around a given address according to a prescribed probability distribution function such as a normal or a uniform distribution. Further, when used with the general store of a computer, certain areas of this general store could be allocated for particular uses, such as I/O area, intermediate results area, etc. Although a particular area would normally be bounded, in the case of maximum demand for space in this area, addresses in other areas would be selected by the addressing device. That is, there is probability that a given address distribution might extend into other areas. For example, if a uniform distribution on a certain group of address were assumed, this distribution might extend into other areas. These areas correspond physically to the "tails" of the distribution curve. Therefore, if there were an excess demand for space in this area, locations in other areas would be sought until the entire record to be stored was actually stored.

The self-addressing memory consists of two units, the store which could be a conventional core memory, and an address control unit. This invention is directed particularly toward this address control unit. The functions of these two units can be incorporated into one physical unit of equipment.

The address control unit is a two-dimensional array of nodes, certain ones of which can be electrically linked together to form a chain. Each node of the address control unit corresponds to either one or a block of words in the memory. Corresponding to every record stored in the memory, there exists one such chain of nodes, one node for each one, or a block of, words in the record. Upon writing, or entering, the record into the memory, a connection is propagated among the nodes, one after the other, until all of the record has been entered into storage. This connection is propagated from an initiating node according to the preference selection roles built into the array. This record is identified, for the purposes of later readout, by the particular initiating node, or source, with which it is associated. The address or "name" of this source is the sole identification required for the entire record. An actual electrical linkage among the nodes forming the chain for any given record is maintained throughout the lifetime of this record in the storage device. This linkage can be disrupted or destroyed upon a signal from the control circuitry associated with the address control unit.

In accordance with other embodiments of the invention, a similar array of nodes is used to control a buffer storage unit for a digital computer and an array of nodes is used to control the performance of tasks by particular units of a digital computer.

Referring to FIG. 1 there is shown a diagrammatic representation of a node network. Such a node network is made up of a plurality of sources, sources 1–3 being shown, and a number of individual nodes, nodes 4–12 being shown.

Each record which is to be stored in the memory is associated with a particular source, for example, source 1, designated $S_A$. A sequential connection is then established between a number of nodes, one node being energized for each word in the record, or one node being energized for each group of words in the record. Each node is associated with a particular storage location in the memory unit and energization of that node allows a particular word to be entered into that particular storage location.

The various nodes are divided into levels. The first level, designated $i$, comprises node 4, $N_{ix}$, node 5, $N_{jy}$, and node 6, $N_{iz}$. Similarly, the second level, designated $j$, includes nodes 7, 8 and 9 and the third level, designated level $k$, includes nodes 10, 11 and 12.

A path or connection through an array of this nature might be established as follows:

(1) $$N_{ix} \rightarrow N_{jy} \rightarrow N_{kx}$$

That is, the connection is established through nodes $N_{ix}$, $N_{jy}$, etc.

It is necessary that a preference be established for the nodes at each level. That is, a preference must be established for each node at that level with respect to every other node at that level. An example of this is:

(2) $$N_{iy} > N_{iz} > N_{ix}$$

This means that, when establishing a connection through the node array, at level $i$, $N_{iy}$ is preferred to $N_{iz}$; and $N_{iz}$ is preferred to $N_{ix}$ in establishing a connection. Hence, in establishing a connection, $N_{iy}$ will be used if it is not "busy"; i.e., already part of another connection previously established.

In the array as described above, connections of maximum length $m$ can be established. This array could provide connections or chains of nodes in excess of $m$ in length simply by switching back through the nodal network. A typical chain of this sort would be:

(3) $$N_{ix} \rightarrow N_{jy} \rightarrow N_{kx} \rightarrow N_{jx} \rightarrow N_{iy}$$

*Self-addressing memory*

A system including a node array which generates the sequence of addresses required for the storage of the words of a record is shown in FIG. 2. In such a system a source node is picked for each record. The address of this source corresponds to a record address for this record and remains in that association throughout the lifetime of the storage of this record in the storage device. In order to select a particular source to be associated with a particular record, the record address is connected to the source control network 201 which in turn picks one of a plurality of sources 202. An exclusive connection is then established through a number of nodes in the node network 203, one node being energized for each word of the record read into the memory. The outputs of each of the nodes are connected through a converter 204 to the memory address decoder 205. The converter 204 merely converts the energization of a particular node output into a code which can be accepted by the memory address decoder to allow the entering of a particular word into a particular storage location in a magnetic core memory 206.

The connections through the node network 203 are established synchronously so that the connection is allowed to proceed to the next level only after the newly selected node is gated to the memory address decoder 205 where the proper memory address is selected and the corresponding word of the record is read into the magnetic core memory 206 over an input 207. The electrical connection through the node network remains so long as the record remains stored in the magnetic core memory. When the source is turned off, the connection is broken and the nodes employed in the connection are, therefore, made idle. Thus, they are available for inclusion in other connections corresponding to the storage of other records.

Determining the addresses of the words comprising a record which is to be read out of storage is very similar to the process for developing the addresses described above. The words are read out of the magnetic core memory 206 over an output line 208 as the node network 203 generates the plurality of readout signals, each corresponding to one of the nodes in the connection associated with the particular record to be read out.

The node network 203 is under control of a node network control circuit 209 which produces the signals necessary to write the record into or read the record out of the magnetic core memory. The node network control circuit 209 is under control of a write signal applied over the input 210 or a read signal applied over the input 211. When the node network control circuit 209 is under control of a read signal applied over the input 211, the network control signal will sequentially produce a plurality of control signals designated "read level $j$," "read level $k$" . . . "read level $m$" and so on. These sequential signals are applied through read control circuit 212 to the node network 203. Simultaneously, with the occurrence of each "read level" signal, a spike generator 213 produces a read spike which is applied through one of the sources 202 which is associated with the record being read to the node network 203. Thus, when the first level of the node network 203 is being read, the signal "read level $i$" is energized and simultaneously a read spike is connected through the particular source 202 associated with the record being read to the node network 203. The simultaneous application of these two signals to the first level in the node network energizes a particular node in the first level and this node, acting through converter 204 and memory address decoder 205 permits a word to be read from the particular storage location in the magnetic core memory 206 or over the output line 208. The operation then proceeds with the occurrence of the "read level $j$" signal and the occurrence of another readout spike from spike generator 213. This causes the next level of the node network to be energized and another word to be read out of magnetic core memory 206.

The node network 203 is shown in more detail in FIG. 3 which shows two levels of the node network, each of which includes three nodes. The first level, designated level $i$, includes a node 301, designated $N_{ix}$, node 302, designated $N_{iy}$ and node 303, designated $N_{iz}$. The sources are shown diagrammatically in FIG. 3 as being three position switches. For example, the source $S_A$ includes a switch 304 which can be set to a position 304a, 304b, or 304c. When the switch 304 is positioned on the contact 304a, as shown in FIGURE 3, a voltage $V_{hold}$ is applied to the various nodes in the first level and this voltage maintains any connection which has been established through source $S_A$ to one of the nodes in the first level. When the switch 304 is in the position 304b, the nodes associated with that source are in the open condition through these nodes. When the switch is in the position 304c, a read spike from the generator 305 is applied to the nodes at the various levels associated with sources $S_A$ and the nodes associated with this source are read.

Similarly, source $S_B$ is shown diagrammatically as including the switch 306 and source $S_C$ is shown as including the switch 307. It should, of course, be understood that the switches shown could be replaced by electronic components for performing the switching functions of the sources.

In order to establish a preference for the selection of a particular node in a level relative to the other nodes in that level in a given sequence of nodes at several levels, each node is interconnected with the other nodes in that level. In the embodment shown, it is assumed that node 302, $N_{iy}$, is preferred to node 303, $N_{iz}$, which is, in turn, preferred to node 301 $N_{ix}$. Therefore, three outputs from node 302, designated $S_{AY}$, $S_{BY}$, and $S_{CY}$ are connected through lines 308, 309, and 310 to the other nodes in level $i$. The negation of these three outputs will inhibit the selection of nodes 301 and 303 in a connection unless node 302 is already in use, that is, it is busy. Similarly, nodes 301 and 303 are interconnected with each other and with node 302 to completely establish an order of preference in the establishment of connections through level $i$.

Three control signals are also applied to the nodes of level $i$. The first of these control signals, designated "proceed to next level" is applied to nodes 301, 302 and 303 over the line 311. This signal occurs cyclically and controls the advancement of a connection through the various levels of the node network. The signal advances the connection through level $i$ to the next level. A second control signal "read level $i$" is applied to all of the nodes in level $i$ when it is decided to read information out of the memory. This signal is applied over the line 312 to all of the nodes in level $i$. A third signal, designated "reset FF's" is applied over a line 313 to all of the nodes in level $i$ and resets output flip-flops in these nodes after the nodes have been used in any cycle for reading information from the memory.

Each node has an output, the one from node 301 being over the line 314. The line 314 is connected through converter 204 to the memory address decoder and indicates the storage location into which information is to read or from which information is to be read. Similarly, the output from node 302 is over line 315 and the output from node 303 is over line 316.

The outputs from each of the nodes in level $i$ are also connected to the various nodes in the next level, designated level $j$. Level $j$ includes the nodes 317, 318 and 319. The nodes of this level are interconnected in the same way that the nodes of level $i$ are interconnected and the same control signals are applied to the nodes of level $j$.

Figure 4:
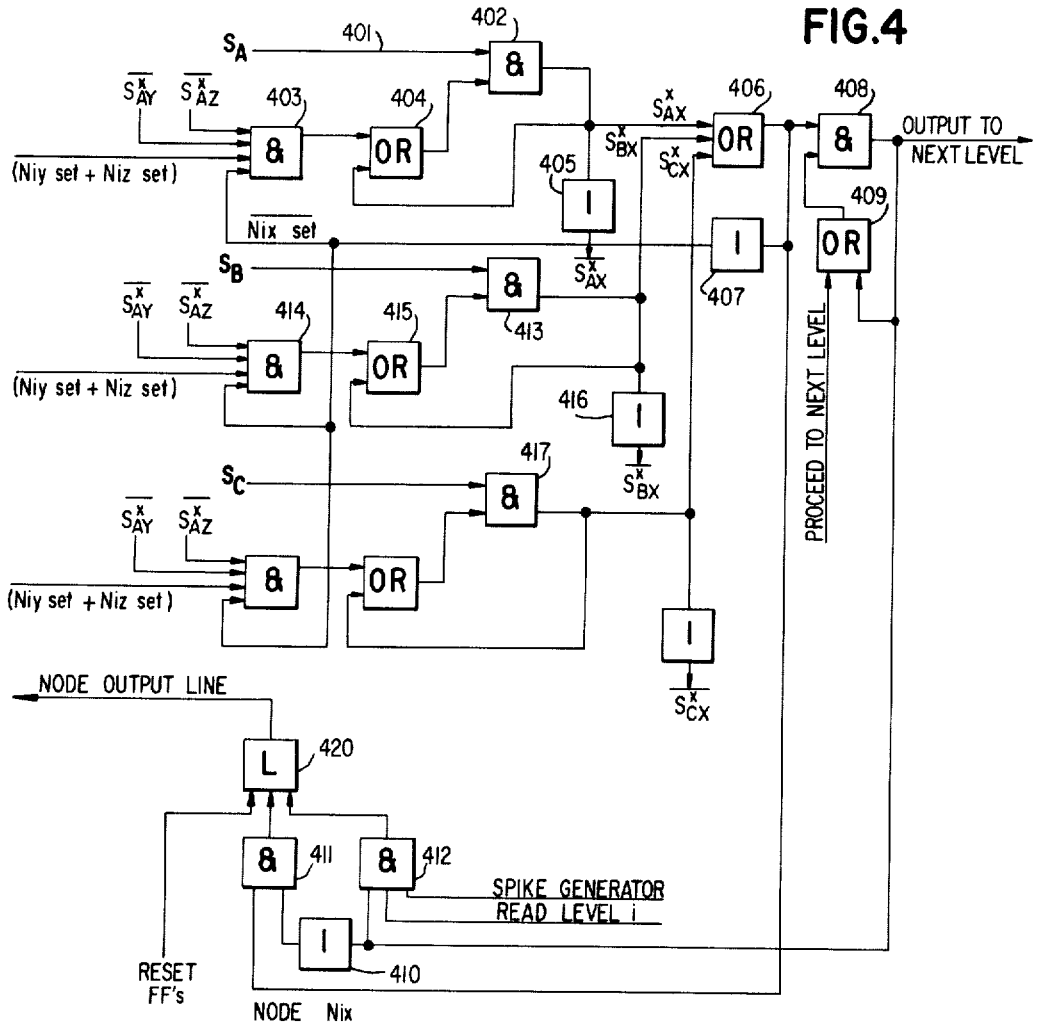
FIGURE 4 is a logic diagram of a single node in the node network.

Referring to FIG. 4, there is shown a logic diagram of a single node which may be employed in the node network array. This node corresponds to the node $N_{ix}$ previously described. When the source $S_A$ is energized, the line 401 is raised thus enabling AND gate 402. The other input to AND gate 402 is a signal indicative of the negation of all signals which might inhibit the connection of node $N_{ix}$ in a connection. In order to form such a signal, the signals $\overline{S^x_{AY}}$ and $\overline{S^x_{AZ}}$ are applied to an AND gate 403. These signals are indicative of the fact that source $S_A$ has not previously been connected to either node $N_{iy}$ or $N_{iz}$. In either case, it would not be desirable to put node $N_{ix}$ in a connection with source $S_A$. Also, the signals $N_{iy}$ set plus $N_{iz}$ set are applied to AND gate 403. These signals indicate that nodes $N_{iy}$ and $N_{iz}$ are already set. Therefore, since the other nodes in level $i$ are already set it is desirable to use node $N_{ix}$ in a connection. If either of these nodes, $N_{iy}$ or $N_{iz}$, were not set, $N_{ix}$ would not be used in a connection since both $N_{iy}$ and $N_{iz}$ are preferable to $N_{ix}$ in making a connection. The output of AND gate 403 is connected through OR gate 404 to the other input of AND gate 402. When all of the conditions for establishing node $N_{ix}$ as a node in a particular connection are established, the output of AND gate 402 is up. The output of AND gate 402 is designated $S^x_{AX}$. This signal is inverted in inverter 405 which forms the signal $\overline{S^x_{AX}}$ and this signal is connected to other nodes in level $i$ to indicate that $S_A$ is connected to $N_{ix}$. The output of AND gate 402 is also connected back through OR circuit 404 to the input of AND gate 402 so that once the signal $S^x_{AX}$ is established it is locked-in through OR gate 404. The combination and AND gate 402 and OR gate 404 is termed a "latch."

The signal $S^x_{AX}$ is one of several inputs to an OR circuit 406 the output of which is used to set a latch 420 to indicate that the node $N_{ix}$ is energized or used in a connection. When the latch 420 is set, the memory storage location associated with the node output line taken from the latch 420 can be read to or written from. The output from OR gate 406 is also inverted in an inverter 407 to produce the signal $\overline{N_{ix}}$ set. This signal is applied to AND gate 403 and other AND gates in the node $N_{ix}$ to prevent $N_{ix}$ from being used in connection when it is already in use or busy. The output of OR circuit 406 is connected through an AND circuit 408 to form the output to the next level. AND gate 408 is energized only when the output of OR gate 406 is up and the signal "proceed to next level" occurs. The output of AND gate 408 is connected back through OR gate 409 to the input of 408 to lock-in the output of AND gate 408 when it occurs.

The output of AND gate 408 is also connected through an inverter 410 to an AND circuit 411. The output of OR gate 406 forms the other input to AND gate 411. Between the time that OR gate 406 produces an output indicating the node $N_{ix}$ is to be included in a connection and the time at which the output to the "proceed to next level" signal occurs, the AND gate 411 is energized thus producing an output which set latch 420. After the occurrence of the "proceed to next level" signal, the signal "reset FF's" occurs which resets the latch 420.

An AND circuit 412 also provides an input to set the latch 420 in order to read the information out of the memory when this is desired. The output of AND gate 408 forms one input to AND gate 412 and the "read level $i$" signal forms another input to AND gate 412. The third input to AND gate 412 is from the spike generator. There will be a spike pulse input to AND gate 412 only when the record which it is desired to read is associated with one of the sources connected to the node $N_{ix}$. If we assume that the record which it is desired to read is associated with source $S_A$, there will be a spike input to AND gate 412 from switch 304 and contact 304$a$, FIG. 3, during read time. This spike passes through AND gate 412 because the other inputs to AND gate 412 are up. That is, the output of AND gate 408 is up because node $N_{ix}$ is included in the connection from source $S_A$ and the signal "read level $i$" is up during this read time. Therefore, the output of AND gate 412 sets latch 420 through an A.C. input to latch 420. The output line of latch 420 is then up and the information contained in the storage location associated with node $N_{ix}$ is read out. After read out time the "reset FF's" signal occurs and the latch 420 is reset.

Two other sources, $S_B$ and $S_C$ are also connected to node $N_{ix}$. Source $S_B$ is connected through an AND gate 413 to form a second input to OR gate 406. The output of AND gate 413 is designated $S^x_{BX}$—, indicating that node $N_{ix}$ is associated with source $S_B$. The other input to AND gate 413 is a signal indicative of the negation of any signals which would inhibit the use of node $N_{ix}$ in a connection involving source $S_B$. In order to form such a signal, the signals $\overline{S^x_{AZ}}$, $\overline{S^x_{AY}}$, and the signals $N_{iy}$ set plus $N_{iz}$ set are applied to an AND gate 414. Also applied to this AND gate is the signal $\overline{N_{ix}}$ set which is indicative of the fact that the node $N_{ix}$ is not already busy. The output of AND gate 414 is connected through OR gate 415 to the other input to AND gate 413. The output of AND gate 413 is connected back through OR gate 415 to lock-in the output of AND gate 413 once it is obtained. The output of AND gate 413 is also connected to an inverter 416 which produces the signal $\overline{S^x_{BX}}$.

Similarly, the source $S_C$ is connected through an AND gate 417 and associated circuitry to form the third input to OR gate 406. Therefore, the node $N_{ix}$ can be associated with either $S_A$, $S_B$ or $S_C$.

The operational sequence for writing a record into the magnetic core memory 206, shown in FIGURE 2 is as follows:

First, the "reset FF's" line is raised thus resetting all of the latches such as the latch 420 in node $N_{ix}$. Next, an available source is selected which is to be associated with the record to be written into the memory. Next, the "proceed to next level" line is raised. This allows one of the nodes in the first level to be selected in accordance with the availability of the nodes in that level and in accordance with the preferences established for the selection of nodes of that level. Upon the occurrence of the "proceed to next level" signal, the output latch in the node selected is set and the first word of the record is entered into the storage location associated with that node. Next, the "reset FF's" line is raised thus resetting the latch in the selected node. This process is then repeated for the next word of the record which is to be entered into a storage location. The process continues until all of the words of the record are entered into storage locations in the magnetic core memory.

The operational sequence for reading a record out of the magnetic core memory is as follows:

First, the "reset FF's" line is raised. Next, the source corresponding to the record to be read out is selected. Next, the "read level $i$" line is raised. Next, a voltage spike is put on the source line corresponding to the record which is to be read out. This sets the latch for the node of the first level corresponding to the connection which has been established for the record being read. The output line of this node enables the particular storage location associated with this node through the memory address decoder, and that word is read out. The "reset FF's" line is again raised. The process is repeated with the exception that during the next cycle the "read level $j$" line is raised. The process continues with each level being raised until the record is completely read out of the several memory locations in which are stored the words which comprise the record. The source is then disconnected if the record is not to be read out again. If the record is to be read out repetitively the source is not disconnected.

Under certain circumstances it is desirable to include a particular node in a connection regardless of the preferences existing among the various nodes of that level. A slight modification which makes this possible is shown in FIG. 5 in which like numerals refer to the similar circuitry of FIG. 4.

Figure 5:
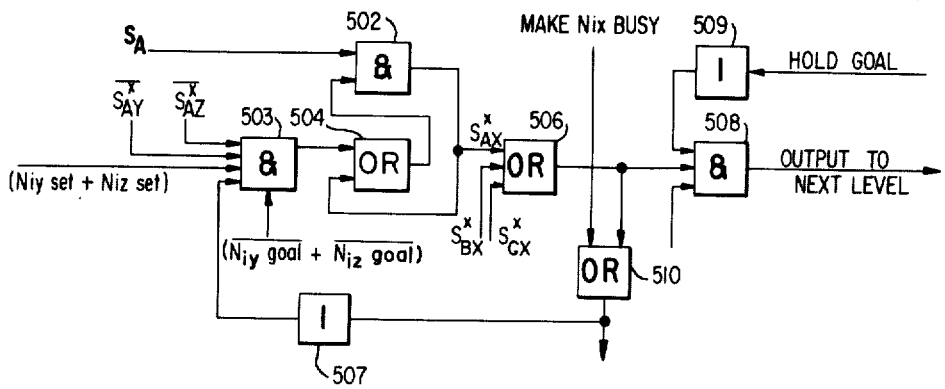
FIGURE 5 is a logic diagram of a modification of the node network.

Referring to FIG. 5 there is shown how the general node circuit of FIG. 4 is modified to permit the establishment of a unique connection from any source node to any given node, if available, in the network. The modification includes a "hold goal" signal which is applied to AND gate 508 through an inverter 509. The "hold goal" line is activated only until the connection, terminating in this node, is established through intervening available nodes. The actuation of this line permits the node to enter into a connection regardless of whether it may be less preferable than any one or all of the other nodes of its level. The negation of all other "hold goal" lines for this level are AND'ed together to inhibit the establishment of the goal seeking connection to this goal if it is not the goal node regardless of whether it may be preferred to that node in normal establishment of the sequence. That is, the signals $N_{iy}$ goal and $N_{iz}$ goal are negated and applied to AND gate 503 to inhibit the establishment of a connection through this goal if it is not the goal node.

The goal seeking connection is established just like any other connection in the write sequence already described. The addition to this is that the right "hold goal" line must be activated at least until the goal is reached, that is, the connection is established. Read out is accomplished in the same manner as described above.

Several connections of this nature could be established one after the other, one at a time. Thereby, nodes on successive levels can be established into a chain simply by considering each one to be a goal successively until all of the nodes are established in one chain. The line labeled "hold goal" in FIG. 5 is actuated during the period in which the "proceed to next level" signal is applied to the nodes of this level to propagate some other connection such that this connection will not also try to propagate itself and thereby interfere with the connections being properly established.

In FIG. 5 there is also shown a signal labeled "make $N_{ix}$ busy." This represents another modification of the circuit shown in detail in FIG. 4. If both this line and the "hold goal" line are simultaneously actuated, this node will be made unavailable for its inclusion in a connection through the network. Such a node is termed a "busy" node.

Figure 6:
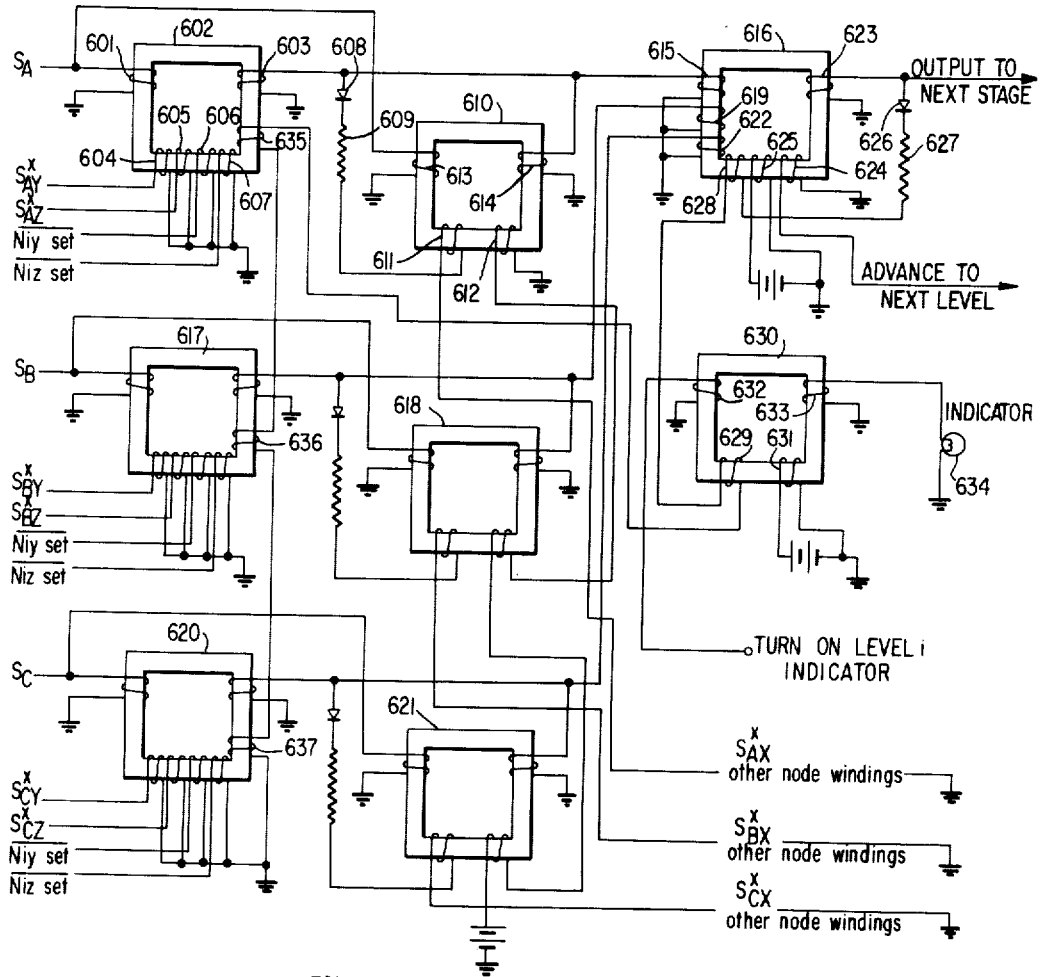
FIGURE 6 is a circuit diagram of one embodiment of the single node.

One circuit which may be used to implement the node logic diagram of FIG. 4 is shown in FIG. 6. The circuit shown in FIG. 6 utilizes A.C. magnetic amplifiers including ferrite cores which are saturated with D.C. applied on appropriate windings. The input from source $S_A$ is an A.C. signal which is applied to a winding 601 on the ferrite device 602. The A.C. input signal will be coupled through to an output winding 603 only if the ferrite device 602 is unsaturated. The ferrite device 602 is driven to saturation if any one of the signals $S^x_{AY}$, applied to winding 604, $S^x_{AZ}$, applied to winding 605, $\overline{N_{iy} \text{ set}}$, applied to winding 606 or $\overline{N_{iz} \text{ set}}$ applied to winding 607 is up. Once the signal $S_A$ is coupled to the output winding 603, it is applied through a diode 608 and a resistor 609 to a holding core 610. The A.C. signal $S_A$ is rectified in the diode-resistor combination 608, 609 and applied to the winding 611 on the holding core in such a manner as to overcome the bias applied to the holding core through bias winding 612. When this occurs the signal $S_A$ is coupled from winding 613 through the holding core to the output winding 614. Therefore, once the signal $S_A$ is coupled through the core 602, it will remain coupled to the output through a holding core 610. The signal $S_A$ is then connected to a winding 615 on the output ferrite device 616.

The input signal $S_B$ is similarly coupled through an input core 617 and holding core 618 to the winding 619 on output core 616. Similarly, the signal from the source $S_C$ is coupled through input core 620 and holding core 621 to winding 622 on the output core 616. The output core 616 serves as an OR circuit in that a signal on any one of the windings 615, 619 or 621 will be coupled to the output winding 623. The output core serves as an AND device in that there will be an output only if the advance to next level signal applied to winding 624, is present to overcome the saturating bias applied to winding 625. When an output is produced on the winding 623 it is rectified in the diode 626 and resistor 627 and applied to the holding winding 628 so as to hold the output core 616 in the unsaturated condition. The output is also connected to a winding 629 on the indicator core 630. When the output signal is present the signal winding 629 overcomes the saturating bias applied to winding 631 so that the indicator core 630 can couple a "turn out" signal from winding 632 through to winding 633 which will in turn energize the indicator 634. The output is also connected through winding 629 to biasing windings 635, 636, and 637. When the node is energized, the rectified output signal applied to windings 635–637 saturate the ferrite devices 602, 617 and 620 to prevent other sources from energizing the node.

*Buffer-storage device*

Figure 7:
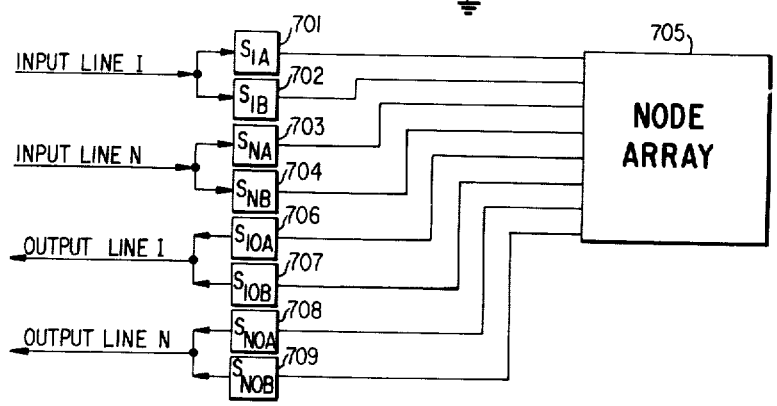
FIGURE 7 is a diagrammatic representation of a buffer storage unit for a digital computer.
Figure 8B:
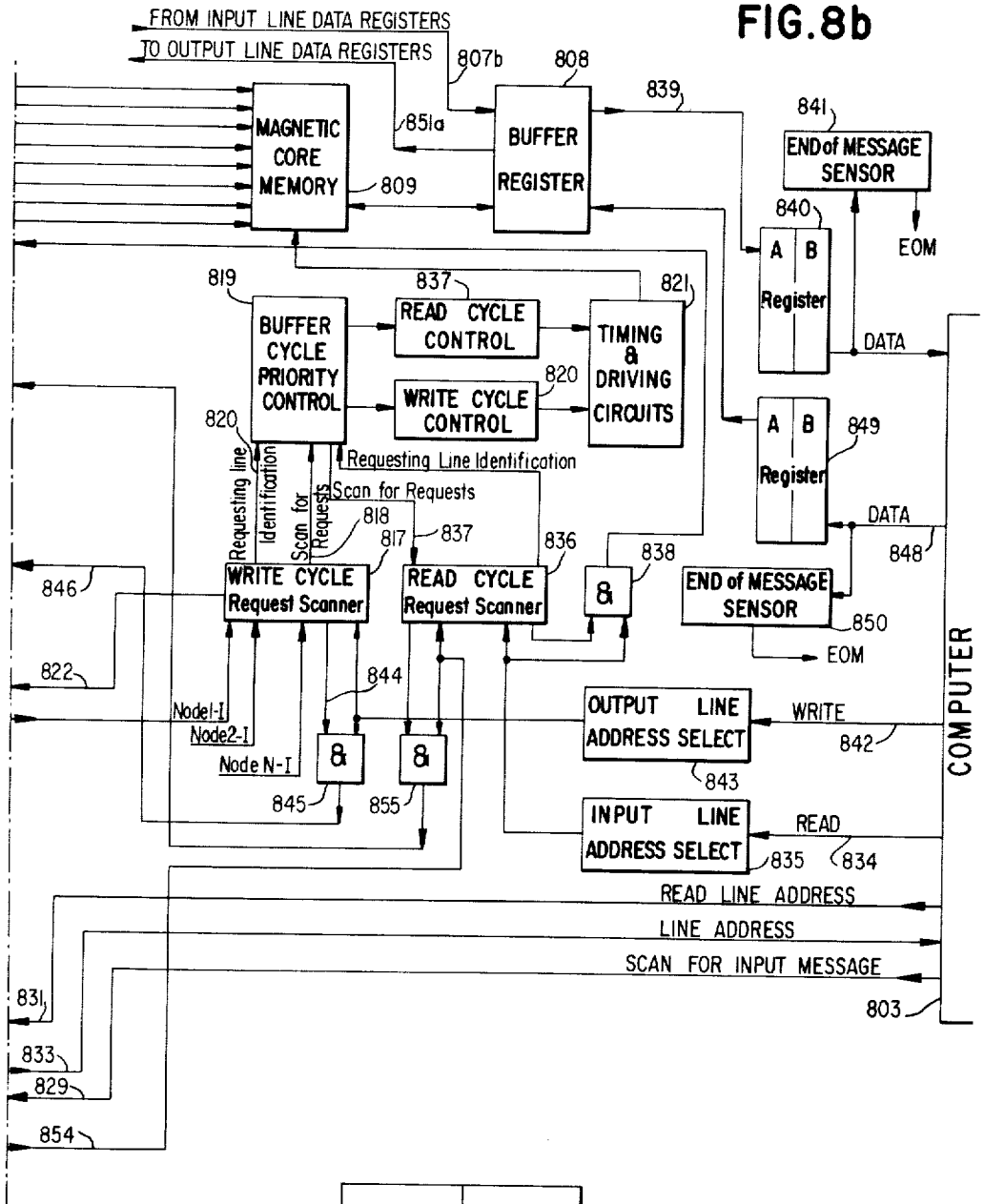
FIGURE 8b is another portion of the block diagram of a buffer storage system.
Figure 8C:
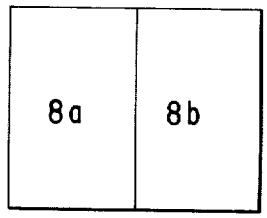
FIGURE 8c shows the manner in which FIGURES 8a and 8b fit together.

The use of the sequential decision making device of this invention for assigning buffer storage space in a computer system is best explained in conjunction with FIGS. 7, 8a and 8b. The system shown in FIGS. 7, 8a and 8b serves as a buffer between several data transmission lines and a digital computer which both receives data from these lines and transmits data out over such lines. In such a system it is quite desirable that messages transmitted over the lines need not be of a definite length. In such a system there must be some method of allocating the buffer storage space in a single buffer which services all of the transmission lines. The sequential decision making device of this invention provides the means for allocating the storage space in a single buffer unit.

Referring to FIG. 7, there are two sources associated with each transmission line. That is, a source 701, designated $S_{1A}$ and a source 702, designated $S_{1B}$, are associated with input line I. Similarly, a source 703, designated $S_{NA}$, and a source 704 designated $S_{NB}$, are associated with input line N. Each of the sources is of the type previously described. That is, each source can be turned on or turned off. All of the sources are connected to the node array 705 which is of the type previously described. While only input lines I and N have been shown, it will, of course, be understood that any number of input lines could be provided.

Each output line is similarly associated with two sources. The output line I is associated with source 706, designated $S_{10A}$, and source 707, designated $S_{10B}$. Also, output line N is associated with source 708, designated $S_{NOA}$ and source 709, designated $S_{NOB}$. The sources 706–709 are also connected to the node array 705.

Each input line has four possible statuses. The first possible status is that a message is being received. Under these circumstances the sources associated with the input line are being used as an identity point for a message presently being accumulated in the buffer from the transmission line. The computer cannot select this source in order to send out a message while it is in this status.

The second possible status for an input line the message ready status. In this case the message for which this source serves as an identity point has been received in full from the transmission line and may be read out by the computer. The computer can scan sources which are in this status whenever it is ready to ingest messages.

The third possible status for one of the input lines is the not selected status. In this case the source is not selected and is not serving as an identity point for a message either arriving or which has arrived on it.

The fourth possible status for an input line is the message being read status. In this case the source was in the message ready status and has been selected by the computer in order that the message for which it serves as an identity point may be read into the computer for processing.

Similarly, the output lines have four possible statuses. The first possible status for an output line is message being transmitted status. In this status, the sources associated with the output line are being used as an identity point for a message presently being transmitted from the buffer onto this transmission line. The computer cannot select this source in order to use it as an identity point for a message which it desires to dispatch onto this transmission line.

The second possible status for an output line is the message ready status. In this case the message for which the source serves as an identity point has been received from the computer and is ready for transmission on the line serviced by this source. This status is reached by the inclusion of an "end of message" character in the message. The "end of message" character was written into the message by the computer. This is a transient status which proceeds to a message being transmitted status unless acknowledgement by the transmission equipment to a "request to transmit" signal from the source equipment is required prior to dispatching the message onto the transmission line.

The message being written status indicates that the sources associated with a particular transmission line were in the message ready status and now the message for which the source serves as an identify point is being transmitted from the computer to the buffer.

The fourth and final status for the output lines is the not selected status. The source associated with particular output line is not selected as an identity point for holding a message to be transmited.

Referring to FIGS. 8a and 8b there is shown a system for assembling and disassembling messages from an input line 801 and an output line 802. The system of FIGS. 8a and 8b serves as a buffer between these input and output lines and a computer 803. It should be understood that various other input and output lines could be handled by this system and the other input lines are shown schematically as input line 804 and output line 805.

Input line 801 is connected directly to a one word data register 806. Each word from the input line 801 is transferred from the data register 806 over line 807a–807b into the buffer register 808. The word is transferred from buffer register 808 into the magnetic core memory 809. This transfer is accomplished under control of node network 810 which acts through the memory address decoder 811 and the memory address register 812 to transfer words of information from the buffer register 808 to the magnetic core memory 809.

When a word is received in data register 806 from input line 801 the line 813 is raised indicating that the first word of a message is received. This line 813 is connected to sources 814 and 815 which are the two sources associated with input line 801. When the line 813 is raised the sources 814 and 815 are put in the message being received status.

The output of the data register 806 is also connected over a line 816 to a write cycle request scanner 817. Upon command of the computer, the write cycle request scanner 817 scans all inputs to determine if any of the the input lines have an incoming message which is to be temporarily stored in the magnetic core memory. The command to scan for input line service requests is received over line 818 from the buffer cycle priority control circuitry 819. When the write cycle request scanner scans an input indicating that one of the input lines has an input word ready to be written into memory, the write cycle request scanner 817 produces a signal indicative of the identification of the requesting input line. This signal is transferred over the line 820 which connects this identification signal to the buffer cycle priority control circuit 819. The buffer cycle priority control 819 then acts through the write cycle control 820 and the timing and driving circuits 821 to gate the input message into the magnetic core memory 809.

The particular storage locations into which the input mensage is to be gated is controlled by node network 810.

When the write cycle request scanner 817 determines that the input line 801 has a message which is to be read into the magnetic core memory, an output is produced over line 822 which enables an AND gate 823. The other input to AND gate 823 is from the line 816 which is up because a word is in the data register 806. Accordingly, AND gate 823 produces an output which is connected over line 824 to the sources 814 and 815. When the line 824 is up, a write cycle is being performed upon input line 801. This write cycle is also controlled by the node network control circuitry 825 which is the same type of circuitry as previously described.

The last word in each input message is an end-of-message word. This word is sensed by an end-of-message sensor 826. The end-of-message sensor 826 produces an output on line 827 indicating that a message is ready for use by the computer. This and other similar input lines are scanned by an input message ready scanner 828. The input message ready scanner 828 scans all of the inputs under the command of the computer 803 which sends out a command over the line 829 commanding the scanner 828 to scan for messages. When the scanner 828 notes a ready message, the address of the input line which is transmitting the message is transferred to the line address register 830. Under command of a "read line address" command over the line 831 to the AND gate 832 the line address is transferred from the line address register 830 over the line 833 to the computer 803.

When the computer is ready to ingest one of the messages which has been stored in the magnetic core memory, the computer transfers the input line address over the line 834 to the input line address select circuit 835. This circuitry is connected to a read cycle request scanner 836 which, under control of a command transferred over the line 837, will scan all of the inputs for read cycle requests. When the read cycle request scanner notes the request to read a particular message, the requesting line identification is transferred from the read cycle request scanner 836 to the buffer cycle priority control 819. The buffer cycle priority control 819 acts through the read cycle control 837 and the timing and driving circuits 821 to transfer information out of the magnetic core memory.

The addresses of the storage locations in the magnetic core memory 809 which are to be read out are determined by the node network 810. If the read cycle request scanner determines that the message ingested over the input line 801 is now to be read out, both inputs to the AND gate 838 are raised. The output of AND gate 838 is connected to sources 814 and 815 and determines that the storage locations in the magnetic core memory 809 which are associated with nodes which are in the connections from sources 814 and 815 will be read out. These storage locations are read out through the buffer register 808 over the data line 839, through the register 840 to the computer 803. The register 840 is included in the data line to provide temporary storage so that there is no delay in the transfer of the data if the message cannot be immediately used. An end-of-message sensor 814 is provided to provide an indication to the computer when the complete message has been read out of the magnetic core memory into the computer.

When the computer is ready to transfer a message to the magnetic core memory for later transmission over one of the output lines, the address of the output line is transferred over line 842 to the output line address select circuit 843. The output of this circuit is also connected to the write cycle request scanner 817. Upon scanning all of the inputs, if the write cycle request scanner 817 notes that the computer is ready to write a message into the magnetic core memory for later transfer over output line I, the write cycle request scanner raises the line 844 which forms one input to an AND gate 845. The other input to AND gate 845 is from the output line address select circuit 843. When both of the inputs to AND gate 845 are raised, the output of AND gate 845 energizes the sources 847 and 848. The sources 847 and 848 establish connections through the node network 810 to control and determine the storage locations to which the computer is to transfer data. This transfer of data takes place over the data line 848, through the temporary storage register 849 and the buffer register 808 to the magnetic core memory 809. An end-of-message sensor 850 senses the end-of-the-message which is being transferred from the computer to the magnetic core memory.

When the message is transferred from the computer to the magnetic core memory the first word of the message is transferred over the lines 851*a* and 851*b* to the word data register 852 associated with output line I over which the message is to be transmitted. The word data register 852 is connected to the AND gate 853 which when energized produces a read cycle request signal which is connected over line 854 to read cycle request scanner 836. When the read cycle request scanner 836 determines that this particular input indicates that a message is ready to be transmitted over output line 1 the read cycle request scanner enables the AND gate 855 the output of which is connected back to nodes 847 and 848. These sources then connect all of the nodes which are associated with the storage locations containing the message to be transmitted over output line I. The message is transferred under control of the node network from the magnetic core memory, through the buffer register 808, over lines 851*a* and 851*b*, through the one word data register 852 and out over output line 802. When the last word of the message is transmitted from the one word data register 852, the end-of-message sensor 856 senses the last word and enables an AND gate 857 which then disconnects sources 847 and 848 from the connection and makes them available for the transmission or reception of another message.

Task ordering device

The sequential decision making circuitry of this invention used as a task ordering device in a computer is described in conjunction with FIGS. 9–16.

Figure 9:
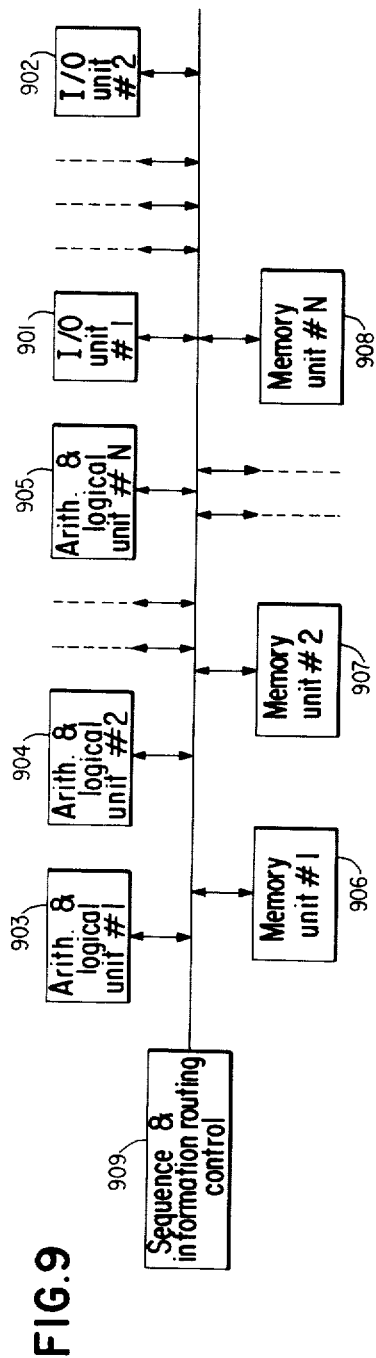
FIGURE 9 is a diagrammatic representation of a sequential task-ordering device for a digital computer.

The sequential decision making circuitry of this invention can be used in a multi-programmed computer in which several programs proceed independently of each other to carry out the various tasks of each program. That is, each program is written in complete disregard of any other program or programs with which it might have to share the facilities of the computer system. In general, a computer system to which such a system might be applied is shown in FIG. 9. Referring to FIG. 9, the computer includes a plurality of input-output units, for example, 901 and 902; a plurality of arithmetic and logical units, for example, 903, 904, and 905; and a plurality of memories, for example, 906, 907 and 908. All of these units may be used simultaneously or sequentially to carry out a plurality of computer programs. These units are assigned various tasks in the programs by the sequence and information routing control circuit 909. The sequential decision making circuitry of this invention performs the function of the sequence and information routing control circuit 909.

Each independent program is designated a task sequence which includes a number of tasks, A, B, C, etc., which must be performed in a prescribed sequence such as: first task A, then task B, then task C, and so on. Each task might for example, represent a sub-routine in the computer. Further, the task could correspond to a particular unit of the computer system such as arithmetic and logical unit 903 in FIG. 9. Then the task sequence would represent the necessary time sequence of operations which must be performed by the computer system in executing the overall program. As a concrete illustration of a system, it will be assumed that the system has ten selectable tasks which are designated A, B, C . . . K. It will also be assumed that the system can handle any sequence of these tasks with a maximum length of seven tasks. This can be represented schematically by the program array shown in FIG. 10. In 10, A–K represent ten selectable tasks which can be performed during any one of time intervals $t_1$ through $t_7$. Each of the nodes in FIG. 10 corresponds to a sub-routine stored at a sequence of addresses beginning at the memory address corresponding to this node. Each node in this circuit consists of several sub-nodes each of which is similar to the circuit shown in FIG. 6. That is, there are several possible paths through a given node point in the array. Each task sequence which employs the task controlled or represented by a particular node is connected to it by means of one of the several sub-nodes which constitute this particular node. For example, in FIG. 10, task sequence I includes the task A at time $t_1$, the task B at time $t_2$, the task B at time $t_3$, the task C at time $t_4$ and the task C at time $t_5$. This is the end of task sequence I. Task sequence II includes tasks A, C, D, C, B, C & E in that order.

Intranode preferences can be set up such that should two task sequences be connected through the same node point simultaneously the task sequence connected to the sub-node having the greatest connection preference will get control of the function related to that node first. Subsequently, of course, the task sequence having the lesser preference for this node will be able to make its request for services by the task represented by this node.

Prior to the execution of the task sequences to be performed, each task sequence is set up by linking the connection establishing sub-nodes at each stage in the node array. Thus, for task sequence I the following connection among connection establishment sub-nodes are made. Task A through Task B through Task B through Task C through Task C. The operation of the sequential task ordering device based upon the node networks described previously is as follows: Each task sequence proceeds stage by stage to completion. At completion of the task sequence, the connections through the sub-nodes are broken unless it is desired to rerun the program corresponding to this task sequence again. Conflicts with other task sequences for computer system facilities at each stage are resolved at each stage where this problem is encountered. At such points of juncture, that is, at a stage at which two task sequences require the use of the same facility and both sequences request the use of this facility simultaneously, the conflict can be resolved on either a first come, first serve basis and/or by a priority scheme. A task sequence could be given an absolute first preference, an absolute second perference or uniform preference, that is first come, first served, with regard to the other task sequences that might be simultaneously contending for the use of a particular task function. In this type operation, the completion of a task at a particular stage will cause a "start function" signal at the node of the next stage which is a member of this task sequence. This start function signal will cause this task to be performed provided that there are no simultaneous requests for this task by other sequences to which a higher preference has been given.

In a more sophisticated system the sequential task ordering device and the computer in general may be controlled by a master control program. With this mode of operation the function completed signals for each task cause a node in another array called the control scanner to be activated. The control scanner is shown diagrammatically in FIG. 11. FIG. 11 shows the broad concepts of the control scanner which is shown in more detail in FIGURES 12 and 13. The control scanner consists of two basic parts, a service request array and a control array. When a function completed signal for a given task is turned on, regardless of which sequence or what stage this function is a part, the corresponding node in the service request array is turned on. The particular node, of the eleven possible in this example, which is turned on is that node which comes at the time level next in sequence. For example, if six nodes had already been turned on, then if a task B gave a function completed signal the node at position B–$T_7$ would be turned on or activated.

When the computer is ready for a master control cycle, that is, it is ready to set up a sequence of tasks it must perform, it gates the first eight of the eleven positions of the service request array into the control array. The number of stages, eight in this example, in the control array is made equal to the number of jobs the computer must have "lined up" to perform at any one time.

Figure 11B:
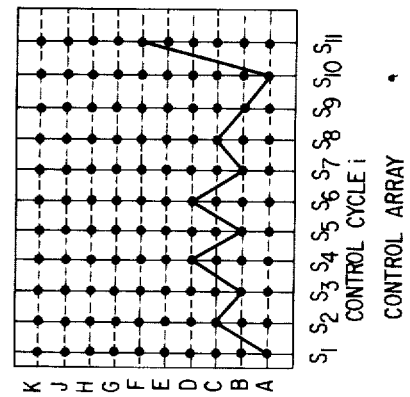
FIGURE 11b shows a control array for a digital computer.
Figure 11A:
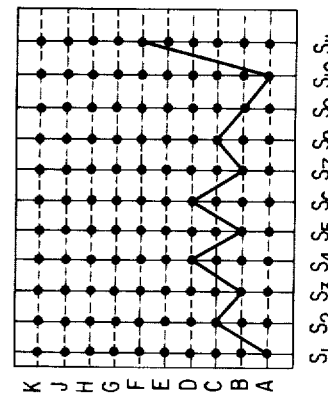
FIGURE 11a shows a service request array for a digital computer.
Figure 10:
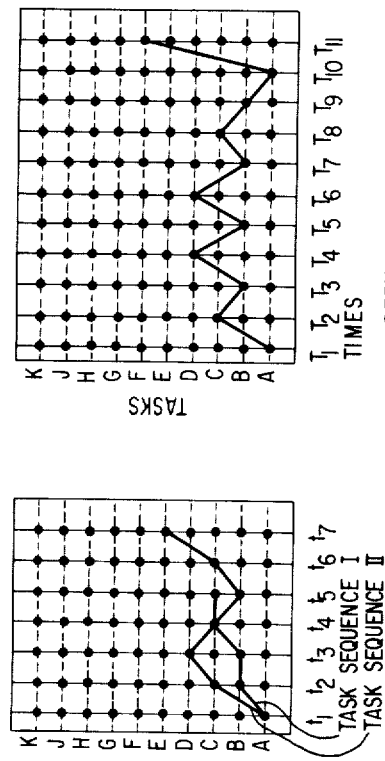
FIGURE 10 shows task sequences for a digital computer.

The activated nodes in the control array shown in FIG. 11b are linked together electrically in the manner described in conjunction with FIG. 5. That is, each activated node is made a goal successively until all eight of the activated nodes are linked together. A node corresponding to a particular task to be performed would be selected as a "goal." A connection would be established to this goal in the manner described above. The nodes forming this connection would correspond to the intermediate tasks which must be performed prior to the designated task. Each of these nodes could likewise correspond to a program in a computer's memory which must be performed before the goal or task program is executed.

When a goal is selected, as described above, nodes corresponding to programs which are not to precede the attainment of this goal are made busy as described above. The remaining available nodes would therefore correspond to possible intermediate tasks in the possible alternate paths available to achieve this desired goal. Further, note that certain nodes which are suitable for inclusion in a connection to this goal node may be busy due to their inclusion in a previously established connection. This could be symbolic of either a particular program's being in use or a particular device, such as an arithmetic unit, or input/output unit being operated in connection with another task sequence.

The various levels in the node network (see FIGURE 1) correspond to the precedence relations existent among the several nodes. For example, any task level $i$ will be executed prior to any task in level $j$.

Figure 12:
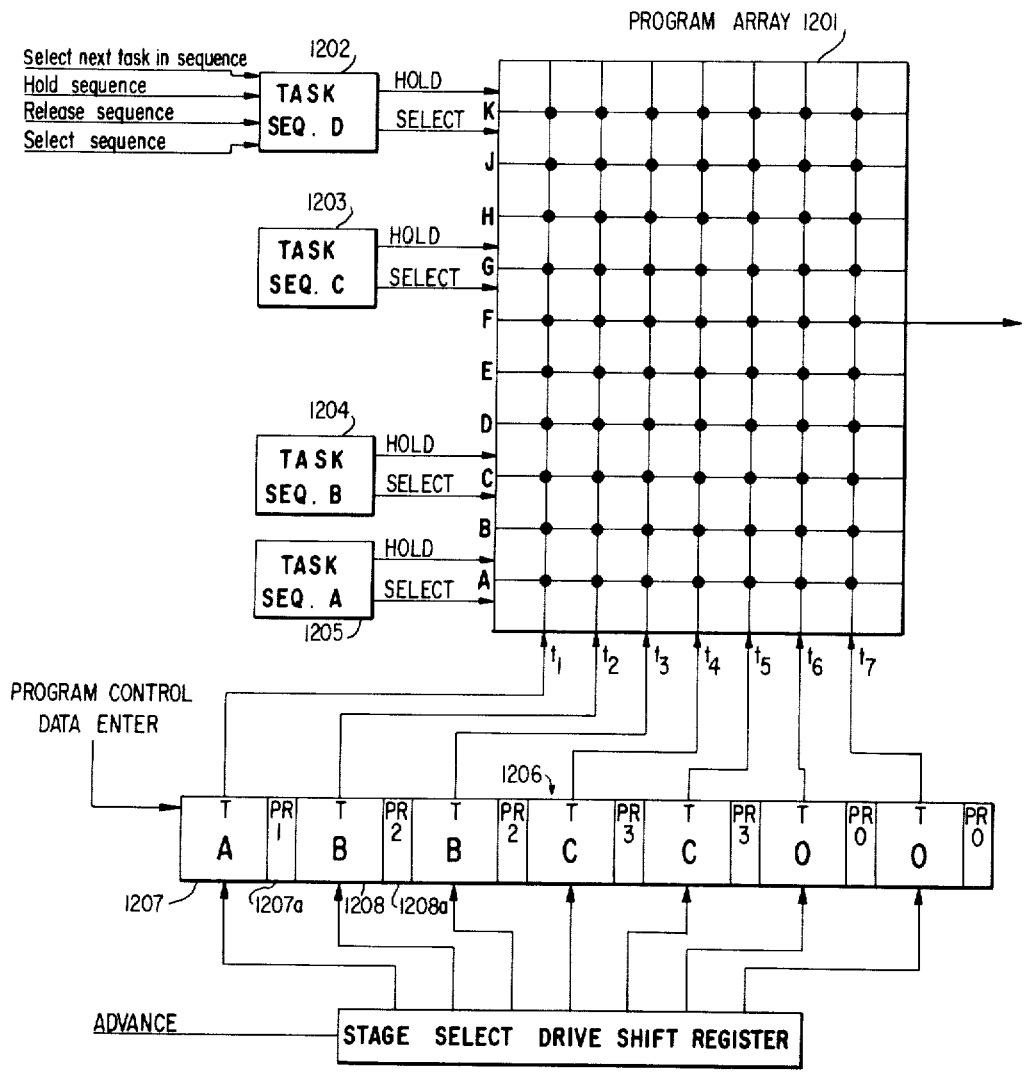
FIGURE 12 shows a block diagram of the program array.
Figure 13:
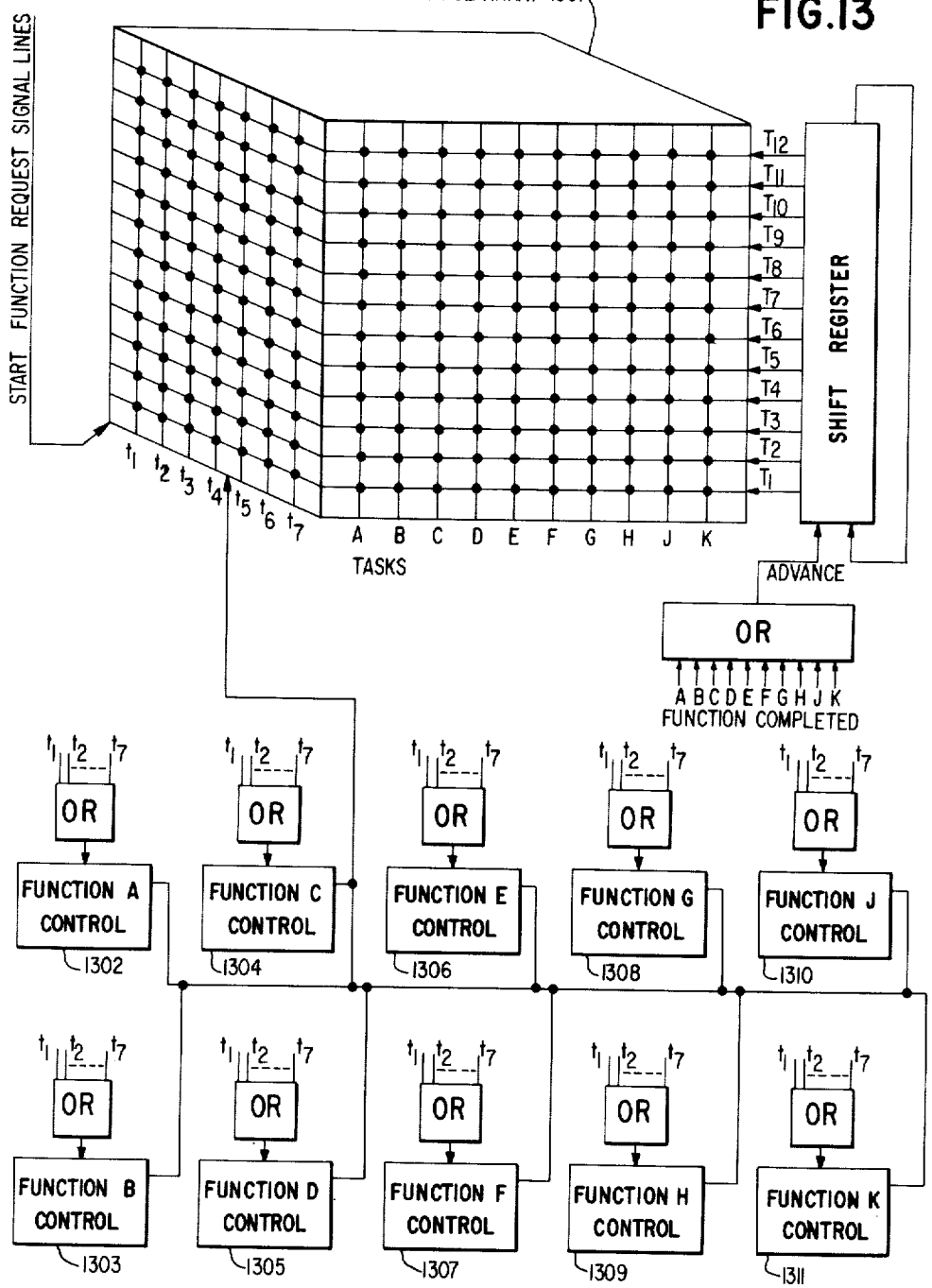
FIGURE 13 shows a block diagram of the service request-control array.

A program control system utilizing the sequential task ordering techniques of this invention is shown in FIGS. 12 and 13. The system includes a program array 1201, program sources nodes 1202–1205, a program task sequence setup register 1206, a service request array and control array formed into one three dimensional array 1301, and various function controls 1302–1311. The program control system also includes the control circuitry necessary to operate this equipment.

The operation of the program control system is as follows:

*(a) Program setup*

Each task sequence is read into the program setup register 1206. The program setup register has a plurality of stages corresponding in number to the number of stages of the program array. There is a corresponding stage of the program setup register for each stage of the program array. Each such stage of the program setup register 1206 is divided into two sections. For example, 1207 and 1207a form the first stage, 1208 and 1208a form the second stage, and so on. The first section of each stage holds the indication of the particular task to be performed in this sequence at this stage. The second section of the stage holds the priority of this sequence for this task at this particular stage relative to other sequences which might select this stage. That is, stage 1207 indicates that the Task A is to be performed at this level. Section 1207a indicates that this task is to be given first preference at this stage. Similarly, stage 1208 indicates tht task B is to be performed at this stage while section 1208a indicates that this task is to be given second preference.

The preferences are indicated as follows:
First preference—"1";
Second preference—"2";
First come, first served; no preference—"3";
Stage not selected for inclusion in this task sequence—"0."

In order to initiate the performance of a particular task sequence, one of the program source nodes 1202–1205 which will serve to identify this task sequence is put into the select mode of operation.

*(b) Program array*

Figure 14:
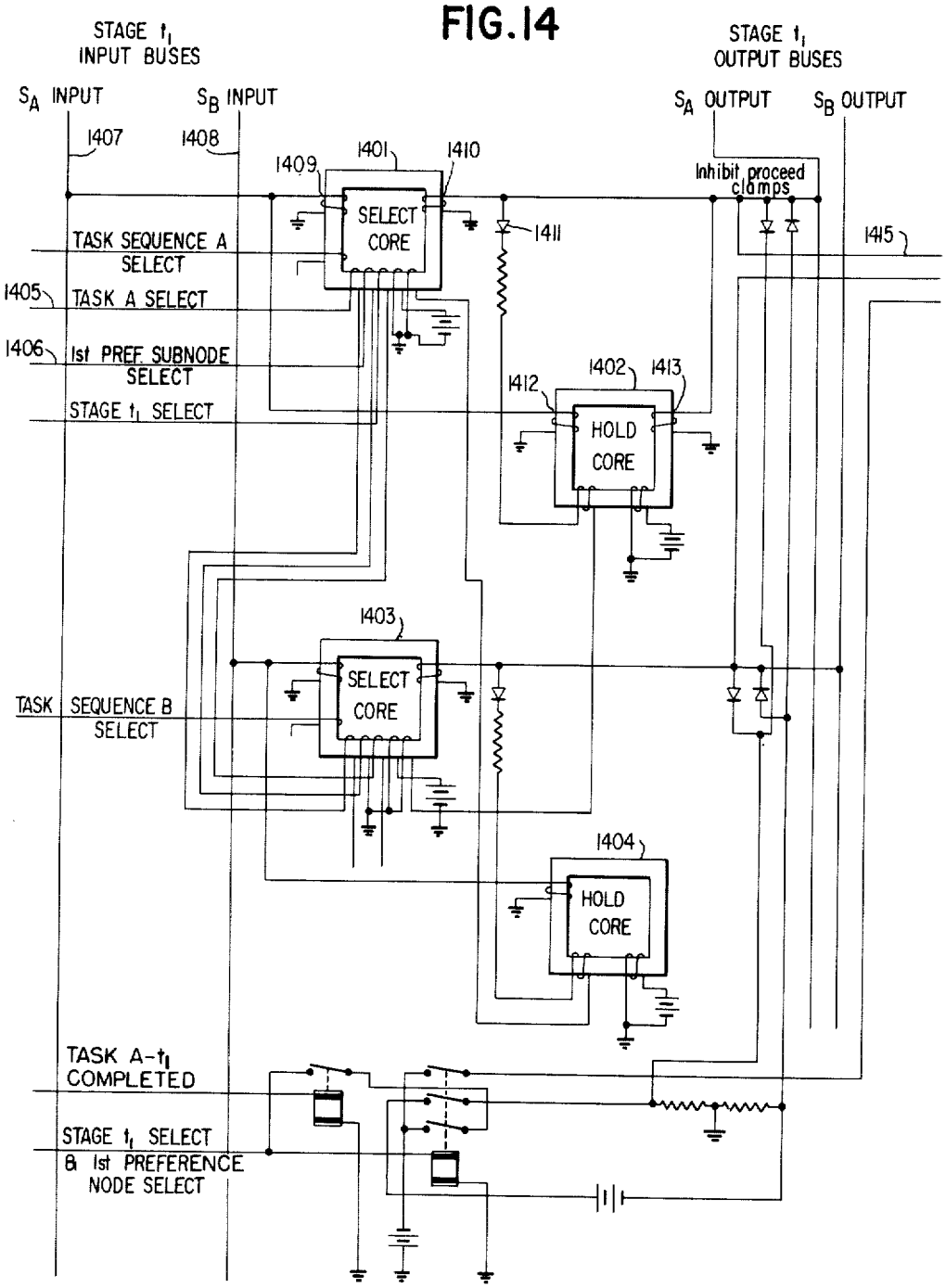
FIGURE 14 shows a circuit diagram of a sample subnode in the program array.
Figure 15:
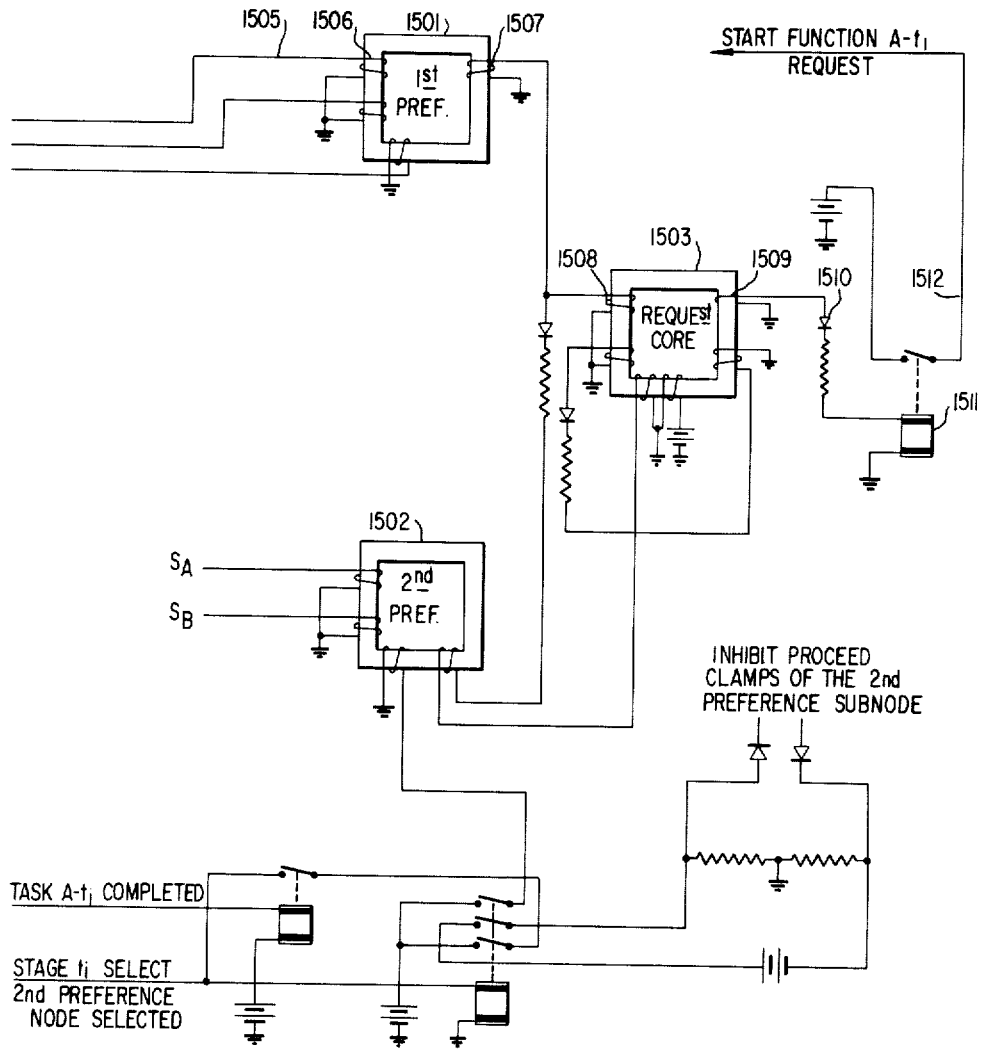
FIGURE 15 shows a circuit diagram of another portion of the program array.

The program array 1201 contains one node corresponding to each selectable task at each stage of the array. The details of the program array are shown in FIGS. 14 and 15. Each node of the program array is subdivided into a number of sub-nodes, there being one sub-node for each preference level. In the example shown in FIGS. 14 and 15 it is assumed that there are two levels of preference and hence two sub-nodes for each node. As shown in FIG. 14 there are two nodes corresponding to task sequence A and task sequence B at level $t_1$.

A typical first preference sub-node and a portion of a second preference sub-node of the program array is shown in FIGS. 14 and 15. As shown in FIG. 14 a select core 1401 and a hold core 1402 are provided for the source $S_A$ input to the sub-node and a select core 1403 and a hold core 1404 are provided for the source $S_B$ input to the sub-node. It will be understood, of course, that as many pairs of select and hold cores as there are sources requiring the use of this sub-node will be provided.

Referring to FIG. 15, a first preference core 1501 is provided and produces an output which connects the sub-node in the particular task sequence given first preference. Similarly, a second preferance core 1502 is provided and connects the sub-node in the task sequence given second preference. If the system is to be provided with more than two preference levels then additional preference cores should be provided. The output lines from the sub-node are OR'd together into a request core 1503. Request for service from second preference, and lower preference, sub-nodes will not be permitted to operate the request core until the request of the first preference, and all order of preferences greater than the given one, have been satisfied.

The task sequence is loaded from the program setup register 1206 into the program array 1201 as follows. The sections of the program setup register 1206 which designate the task to be performed energize the corresponding task select line. For example, assuming that the sub-node shown in FIGS. 14 and 15 is associated with task A, then stage 1207 of the program setup register 1206 energizes the line 1405 designated task A select.

Similarly, the program setup register stage which designates the preference of the task at this stage energizes the corresponding preference sub-node select line. For example, the section 1207a holds a first preference and this section of the stage energizes the line 1406 designated first preferance sub-node select.

Energization of a task select and a preference select line for a particular select core causes the corresponding hold core to pass the A.C. hold voltage from the given program source node to the output. For example, if lines 1405 and 1406 are energized, the A.C. voltage from the particular source node, that is, either from source $S_A$ over input line 1407 or from source $S_B$ over input line 1408, will pass through the select core to the hold core. Therefore, if source $S_A$ is associated with the particular task sequence which is being set up the A.C. hold voltage will pass from input line 1407 to the select core 1401. The A.C. hold voltage will be coupled from the winding line 1409 to output winding 1410 because of the A.C. voltage applied to input lines 1405 and 1406 thus keeping select core 1401 out of saturation. The A.C. hold voltage from output winding 1410 is rectified by diode 1411 and applies an unblocking bias to hold core 1402 thus taking the hold core 1402 out of saturation. Because of this, the hold voltage from input 1407 is coupled from input winding 1412 to output winding 1413 and this coupling continues even though the D.C. voltages are removed from input windings 1405 and 1406. That is, when the D.C. select voltages are removed from the select cores the hold cores maintain the connection for the task sequence.

The sub-node outputs from the cores 1501 and 1502 are OR'd together and connected to the request core 1503 corresponding to the task A function at level $t_1$. The output from output winding 1410 on select core 1401 is connected over line 1415–1505 to input winding 1506 on core 1501. This A.C. signal is coupled to the output winding 1507 on this core. The signal from output winding 1507 energizes input winding 1508 on the request core 1503. The signal from output winding 1507 energizes input winding 1508 on the request core 1503. The signal is coupled to the output winding 1509 and is rectified in diode 1510. The rectified signal energizes the relay 1511 which picks up the relay contacts and produces a signal over line 1512, such as $A-t_1$ or $A-t_2$ at the bottom of FIG. 16, which performs the particular task associated with this node.

The output of output winding 1507 is also rectified in a diode 1513 and applied to the second preference core 1502. This effectively inhibits core 1502 and prevents the second preference from applying an output to request core 1503. The second preference core 1502 and all higher order preference cores are inhibited until the first preference or lower order preferences have been satisfied.

(c) Service request control array

Figure 16:
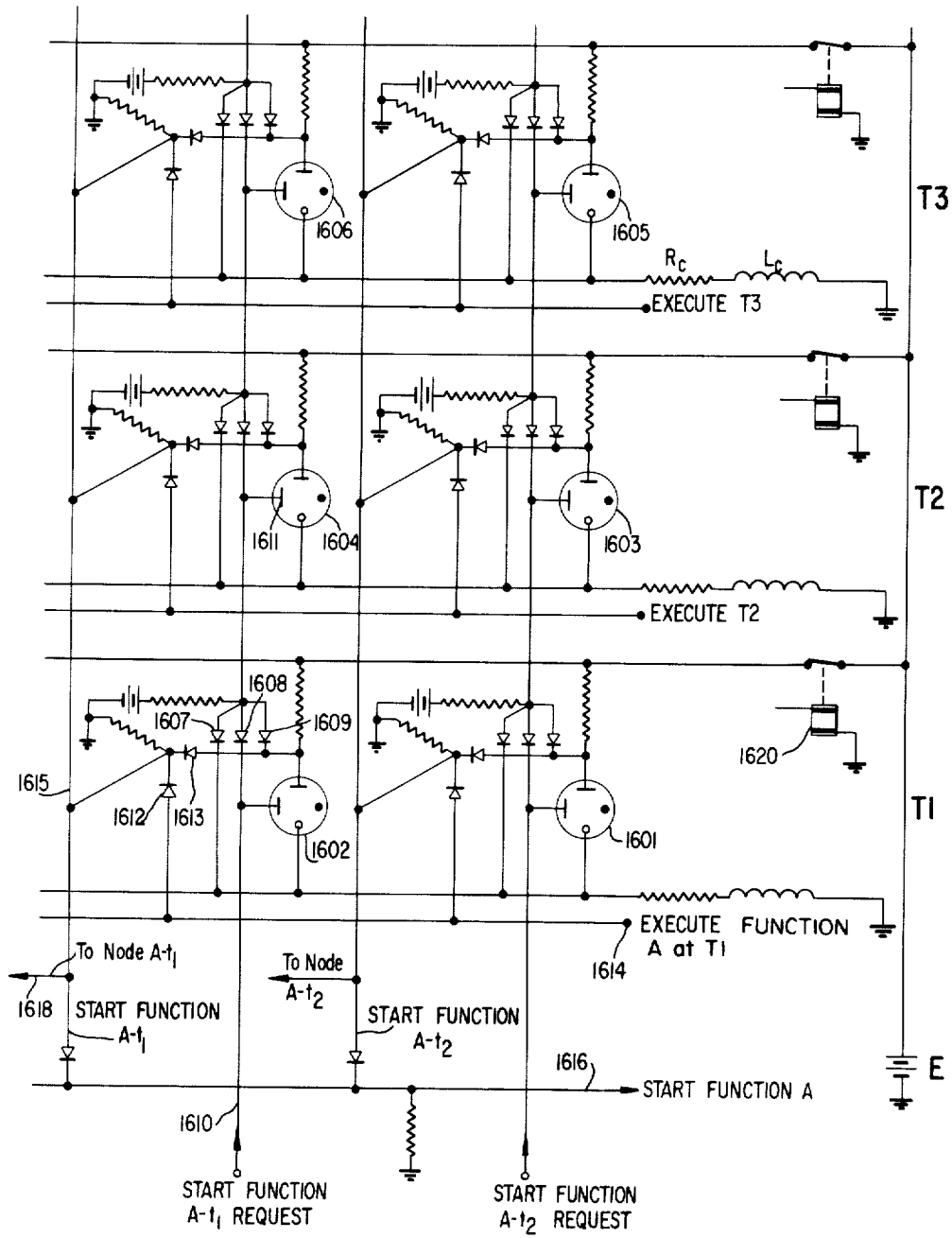
FIGURE 16 is a circuit diagram of the service request-control array.

The service request control array 1301 is constructed of several planes of negative resistance characteristic devices which provide a lock-out feature. Details of a portion of one plane of the service request control array are shown in FIG. 16. As shown in FIG. 16 the lock-out feature is provided by gas tube circuitry. A detailed explanation of gas tube lock-out circuits can be found in the Design of Switching Circuits by Keister, Ritchie & Washbourne, D. Van Nostrand Company, 1951.

The configuration of the gas tube matrix shown in FIG. 16 is as follows. There are N gas tubes for each nodal position of the program array. In the example shown, N is equal to 7 which is the maximum number of tasks which the computer can perform in one master control cycle.

The control array is arranged so that the start function requests are ordered according to time of occurrence. Therefore, only one gas tube can be permitted to be activated at a given level of the array. The array is so arranged that whenever a start function request line is activated this signal tries to turn on the gas tube lowest down in the array, that is, the gas tube which corresponds to earliest service by the master control cycle. The tube at this level for this position node of the program array will be activated unless another tube at this level has already been selected. The service request control array 1301 is arranged so that the planes of gas tubes A, B, C, D, E, F, G, H, J, K, each represent a different task. Similarly, the planes of gas tube $t_1$, $t_2$, $t_3$, etc., each represent a particular stage in a task sequence at which the task is to be performed. The planes of cores designated $T_1$, $T_2$, $T_3$, etc., designate different times during the control cycle at which these tasks can be executed.

The portion of the service request control array shown in FIG. 16 is the portion of the plane of gas tubes which represents task A at the times $t_1$, $t_2$, during a particular task sequence. This portion is shown for the times $T_1$, $T_2$, $T_3$ during the master control cycle. As shown in FIG. 16 gas tubes 1601 and 1602 are associated with master control time $T_1$. Similarly, gas tubes 1603 and 1604 are associated with master control time $T_2$ and gas tubes 1605 and 1606 are associated with master control time $T_3$. A positive going AND circuit is associated with each of the gas tubes. The positive going AND circuit includes three diodes. Associated with gas tube 1602 is a positive going AND circuit including diodes 1607, 1608 and 1609. The anodes of diodes 1607–1609 are connected together and this common connection will rise to a positive level only when the cathodes of all three diodes are at a positive level. The cathode of diode 1607 is connected to the cathodes of the remainder of the gas tubes in the $T_1$ level. Therefore, the cathode of diode 1607 will rise to a positive level when any of the gas tubes in that level have been fired. The cathode of diode 1608 is connected to the start function request line 1610, this line is up only when there is an output from the program array 1201 indicating that function task A is to be performed at time $T_1$. The cathode of diode 1609 is connected to the anode of gas tube 1602. The cathode is up only when the gas tube 1602 is not conducting. When the cathodes of all three of the diodes 1607–1609 are up the anode 1611 on gas tube 1604 is also up and the tube 1604 may be fired. That is, this tube may be selected. However, when any of the cathodes of diodes 1607–1609 are down the tube 1604 and succeeding tubes in this level, such as tube 1606 are prohibited from being fired.

If the gas tube 1602 is selected, a negative going AND circuit including diodes 1612 and 1613 is energized. If the gas tube 1602 is fired, the anode of diode 1613 is down and when an "executive function A at time $T_1$" signal, which is negative going, occurs an input line 1614 the anode of the diode 1612 also goes down and the common connected cathodes of diodes 1612 and 1613 go down. The common connected cathodes are connected to start function $A-t_1$ line 1615. When an output appears on this line there is an indication that the task associated with this particular gas tube is to be performed. The outputs of all of the levels of gas tubes are OR'd together to form the start function A signal on line 1616. The signal start function $A-t_1$, taken from line 1616 is AND'd with the function A completed signal to produce a signal which occurs when this function is completed. This produces the following results:

(1) The higher preference lock-out circuit on the next lower preference sub-node is deactivated thus providing for its associated task sequence to select this function.

(2) The corresponding inhibit proceed clamp circuit is released. While activated, this clamping circuit inhibits the passage of the task select voltage on to the next stage of the program array when the task at this stage has not yet been performed. The clamp voltage is equal to the peak, both greater than zero volts and less than zero volts, of the normal or hold A.C. voltage emitted by the program source node.

(3) The deionization relay at the corresponding level of the control array is deactivated thus permitting a new request to be made. That is, a node at this level may be activated which will be serviced during a subsequent master control cycle.

Separate deionization relays, one for each level, are provided and these are operated independently. The relay 1620 of level $T_1$ is operated thereby reactivating the gas tube in select status at the level immediately upon the completion of the task associated with this tube.

While certain specific embodiments of the present invention have been shown and described, it will, of course, be understood that various other modifications may be made. The appended claims are therefore intended to cover any such modifications within the true spirit and scope of the invention.

What is claimed is:

1. A computer control system establishing a sequence of control signals comprising a plurality of node circuits each of which produces one of said control signals when energized, said node circuits being arranged in levels, means for interconnecting the node circuits in each level in such a manner as to establish a preference in the energization of node circuits in that level, means for sequentially energizing and interconnecting one node in each level with a node in another level in accordance with the preference among unenergized nodes in the respective level, means for maintaining said sequence of nodes in the energized condition to permit the subsequent reproduction of the sequence of control signals produced by said energized nodes and means responsive to said sequence of control signals for performing a desired computer function.

2. A computer control system comprising in combination, group storage means for storing groups of information bits, a utilization device, a plurality of control means each of which is respectively associated with a particular one of said group storage means to effect transfer of information bits between said group storage means and said utilization device, each of said control means indicating by its status the availability or non-availability of the associated group storage means, a storage selection network in which said plurality of control means are arranged in levels, means for interconnecting the control means in each level according to a predetermined order of preference, and means including said control means for establishing reproducible combinations for a number of related groups of information bits in said storage means by selecting a number of said control means corresponding to said number of related groups of bits according to said order of preference and according to the availability of individual group storage means as indicated by their associated control means.

3. A computer control system for gating a variable word length message into and out of a plurality of storage locations, comprising a plurality of node circuits each of which is associated with one of said storage locations, each of said node circuits having an energized and an unenergized state, means responsive to the energized state of each of said node circuits for reading information into or out of the associated storage location, said node circuits being arranged in levels, means for interconnecting the node circuits in each level to establish preferences in the energization of node circuits in that level, means for sequentially energizing one node in each of a number of levels in accordance with the preferences among unenergized nodes in the respective levels, the number of energized nodes being equal to the number of words in the message to be stored, and means for maintaining said sequence of nodes in the energized state to permit the subsequent reproduction of the sequence of control signals produced by said energized nodes in order to read the words of said message out of said storage locations.

4. A computer control system for gating a variable word length message into and out of a plurality of storage locations comprising a plurality of node circuits each of which is associated with one of said storage locations, each of said node networks having an energized and an unenergized state, said node circuits being arranged in levels, the node circuits in each level being interconnected to establish preferences in the energization of node circuits in that level, a plurality of source node circuits, each one of said messages being associated with a particular one of said source node circuits, means responsive to the selection of a particular source node for sequentially energizing one node in each level in accordance with the preferences among unenergized nodes in that level, means for producing control signals for gating the words of said message into the storage locations associated with the energized nodes, means for maintaining said sequence of nodes in the energized state, and means for reproducing the sequence of control signals in response to the selection of said particular source node for gating said words of said message out of said storage locations.

5. The computer control system recited in claim 4, wherein each node circuit includes a plurality of logic circuits each of which is responsive to a signal from a particular one of said source nodes, each of said logic circuits including an AND gate having two enabling inputs, a first of said two inputs being enabled by one of said source nodes, means responsive to the condition of other node circuits in the same level for enabling the second input to said AND gate only when all nodes having a higher preference in that level are energized, means for inhibiting the enabling of said second input when the node circuit associated therewith is already energized, said node circuit further including an OR circuit, the outputs of each of said AND circuits being connected to said OR circuit whereby the output of said OR circuit is indicative of the energized condition of said node circuit.

6. The computer control system recited in claim 5 wherein each AND circuit includes a saturable ferrite core, said ferrite core having a first input winding coupled to said first input, said first input being an A.C. voltage from said source node, said ferrite core having a plurality of second input windings coupled to said second inputs, said second inputs being a plurality of D.C. control voltages each of which is indicative of the condition of other node circuits in the same level, said D.C. control voltages acting through said second input windings to selectively saturate said ferrite core, said ferrite core having an output winding, said A.C. input voltage being coupled to said output winding only when said ferrite core is unsaturated.

7. The computer control system recited in claim 6 wherein each of said logic circuits further includes a ferrite holding core associated with each of said AND circuits, means for normally biasing said ferrite holding core in the saturated condition, means responsive to the output of said first ferrite core for overcoming the bias on said holding core, said holding core including an input winding and an output winding, said A.C. signal being connected to said input winding, said A.C. signal being coupled to the output winding of said holding core only when the output from the said first ferrite core overcomes the bias applied to said holding core.

8. The computer control system recited in claim 7 wherein each of said OR circuits includes a third ferrite core having a plurality of input windings, a plurality of control windings and an output winding, the outputs of each of said first ferrite cores and the outputs of each of said holding cores being connected to the input windings to said third ferrite core, and means for applying control signals to said control windings whereby A.C. signals on any of said input windings are selectively connected to said output winding.

9. The computer control system recited in claim 8 wherein each of said first ferrite cores further includes a biasing winding, means for rectifying the signal from the output of said third ferrite core, means for connecting said rectified signal to the biasing windings on all of said first ferrite cores, said rectified signal driving said first ferrite cores to saturation whereby said first ferrite cores are inhibited from further energization by a source node.

10. A buffer storage system for providing temporary storage for messages of unspecified lengths which are to be transferred between a plurality of input and output lines and a computer comprising a plurality of storage locations, a plurality of node circuits each of which has an energized and an unenergized state, each of said node circuits being associated with a particular one of said storage locations, said node circuits being arranged in levels, the node circuits in each level being interconnected to establish preferences in the energization of node circuits in that level, means for sequentially energizing and interconnecting one node in each level with a node in another level in accordance with the preferences among unenergized nodes in the respective levels, the number of node circuits being energized being equal to the number of words in the message which is to be transferred, means responsive to the energized state of each of said node circuits for transferring a word between a selected input or output line and the storage location associated with that node circuit, means responsive to the energized state of others of said node circuits for transferring a word between the computer and the storage location associated with that node circuit, and means for maintaining said sequence of nodes in the energized state whereby the sequence of word transfer may be reproduced.

11. A buffer storage system for providing temporary storage for variable word length messages which are to be transferred between a plurality of input and output lines and a computer comprising a plurality of storage locations, a plurality of node circuits each of which has an energized and an unenergized state, each of said node circuits being associated with a particular one of said storage locations, said node circuits being arranged in levels, the node circuits in each level being interconnected to establish preferences in the energization of node circuits in that level, a plurality of source node circuits, each one of said messages being associated with a particular one of said source node circuits, means responsive to the selection of a particular source node for sequentially energizing one node in each level in accordance with the preferences among unenergized nodes in that level, the number of node circuits being energized being equal to the number of words in the message which is to be transferred, means responsive to the energized state of each of said node circuits for transferring a word between a selected input or output line and the storage location associated with that node circuit, means responsive to the energized state of each of said node circuits for transferring a word between the computer and the storage location associated with that node circuit, and means for maintaining said sequence of nodes in the energized state whereby the sequence of word transfer may be reproduced in response to the energization of said particular source node circuit.

12. The buffer storage system recited in claim 11 wherein each node circuit includes a plurality of logic circuits each of which is responsive to a particular one of said source nodes, each of said logic circuits including a first AND gate having two enabling inputs, one of said two inputs being enabled by one of said source nodes, means responsive to the condition of other node circuits in the same level for enabling the other input to said AND gate only when all nodes having a higher preference in that level are energized, means for inhibiting the enabling of said second input when the node circuit associated therewith is already energized, said node circuit further including an OR circuit, the outputs of each of said AND circuits being connected to said OR circuit whereby the output of said OR circuit is indicative of the energized condition of said node circuit.

13. A program control system for controlling the operation of a plurality of computer units in performing a plurality of programs each of which has an established preference in regard to the operation of the same computer unit at a particular time comprising a plurality of node circuits each having an energized and an unenergized condition, each of said node circuits being associated with one of said plurality of computer units, said node circuits being arranged in levels, means for interconnecting the node circuits in each level to establish preferences in the energization of node circuits in that level, means for sequentially energizing a plurality of nodes corresponding to the computer units which are to be operated during a particular program, and means for energizing a plurality of different sequences of nodes corresponding to the tasks to be performed in a plurality of other programs in accordance with said established preferences.

14. A program control system for controlling the performance of a plurality of task sequences each of which has an established preference in regard to other task sequences comprising a program array including a plurality of node circuits each having an energized and an unenergized condition, each of said node circuits being associated with a particular task to be performed at a particular time, a plurality of source nodes, each of said source nodes being associated with a particular task sequence, said program control system further comprising a program setup register, including a plurality of stages for storing information indicative of the tasks to be performed in a particular sequence, each stage of said setup register further including means for storing information indicative of the preference to be given the associated task and the sequence in regard to the same task in other sequences, means for energizing node circuits in the program array in accordance with the tasks to be performed in a particular sequence and the preferences to be associated with these tasks, a service request-control array including a plurality of planes of lockout devices, each plane of lockout devices corresponding to the performance of a particular task at a particular time, and means interconnecting said program array and said service request-control array for sequentially energizing one lockout device in each plane in accordance with the tasks to be performed in each of said sequences and the preference attached to the performance of each of these tasks.

15. The program control system recited in claim 14 wherein each node circuit includes a plurality of logic circuits each of which is responsive to a particular one of said source nodes, each of said logic circuits including an AND gate having two enabling inputs, one of said two inputs being enabled by one of said source nodes, means responsive to the condition of other node circuits in the same level for enabling the other input to said AND gate only when all node circuits having a higher preference in that level are energized, means for inhibiting the enabling of said second input when the node circuit associated therewith is already energized, said node circuit further including an OR circuit, the outputs of each of said AND circuits being connected to said OR circuit whereby the output of said OR circuit is indicative of the energized condition of said node circuit.

References Cited by the Examiner

UNITED STATES PATENTS

| | | | |
|---|---|---|---|
| 2,994,064 | 7/1961 | Harris | 340—172.5 |
| 3,067,937 | 12/1962 | Hinkein et al. | 235—157 |

ROBERT C. BAILEY, *Primary Examiner.*

STEPHEN W. CAPELLI, MALCOLM A. MORRISON,
*Examiners.*